United States Patent
Malik et al.

(10) Patent No.: US 11,795,382 B2
(45) Date of Patent: Oct. 24, 2023

(54) PILLAR FRACTURING

(71) Applicant: Saudi Arabian Oil Company, Dhahran (SA)

(72) Inventors: Ataur Malik, Abqaiq (SA); Mohammed A. Asiri, Udhailiyah (SA); Saad Al-Driweesh, Udhailiyah (SA); Rajesh Kumar Saini, Cypress, TX (US); Mohammad Hamidul Haque, Katy, TX (US); Mohammed Sayed, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 152 days.

(21) Appl. No.: 16/928,926

(22) Filed: Jul. 14, 2020

(65) Prior Publication Data

US 2022/0017813 A1    Jan. 20, 2022

(51) Int. Cl.
| | |
|---|---|
| *C09K 8/80* | (2006.01) |
| *C09K 8/64* | (2006.01) |
| *C09K 8/70* | (2006.01) |
| *E21B 43/267* | (2006.01) |

(52) U.S. Cl.
CPC ............. *C09K 8/805* (2013.01); *C09K 8/64* (2013.01); *C09K 8/703* (2013.01); *E21B 43/267* (2013.01); *C09K 2208/08* (2013.01); *C09K 2208/10* (2013.01); *C09K 2208/30* (2013.01)

(58) Field of Classification Search
CPC ......... C09K 8/805; C09K 8/64; C09K 8/703; C09K 2208/08; C09K 2208/10; C09K 2208/30; E21B 43/267
See application file for complete search history.

(56) References Cited

U.S. PATENT DOCUMENTS

| | | |
|---|---|---|
| 4,493,875 A | 1/1985 | Beck et al. |
| 5,604,184 A | 2/1997 | Ellis et al. |
| 6,776,235 B1 | 8/2004 | England |
| 7,044,220 B2 | 5/2006 | Nguyen et al. |
| 7,210,528 B1 | 5/2007 | Brannon et al. |
| 7,255,169 B2 | 8/2007 | van Batenburg et al. |
| 7,281,580 B2 | 10/2007 | Parker et al. |
| 7,281,581 B2 | 10/2007 | Nyuyen et al. |
| 7,334,635 B2 | 2/2008 | Nguyen |
| 7,334,636 B2 | 2/2008 | Nguyen |
| 7,424,911 B2 | 9/2008 | McCarthy et al. |
| 7,451,812 B2 | 11/2008 | Cooper et al. |
| 7,472,751 B2 | 1/2009 | Brannon et al. |
| 7,571,767 B2 | 8/2009 | Parker et al. |

(Continued)

FOREIGN PATENT DOCUMENTS

| | | |
|---|---|---|
| CN | 104727799 | 6/2015 |
| WO | WO 2015071750 | 5/2015 |

OTHER PUBLICATIONS

PCT International Search Report and Written Opinion in International Appln. No. PCT/US2021/041524, dated Nov. 4, 2021, 22 pages.

*Primary Examiner* — Crystal J. Lee
(74) *Attorney, Agent, or Firm* — Fish & Richardson P.C.

(57) ABSTRACT

A system and method for hydraulic fracturing a subterranean formation with fracturing fluid to generate fractures, and intermittently adjusting a characteristic of the fracturing fluid conveying proppant to form pillars of proppant in the fractures.

13 Claims, 7 Drawing Sheets

(56) References Cited

U.S. PATENT DOCUMENTS

| | | |
|---|---|---|
| 7,581,590 B2 | 9/2009 | Lesko et al. |
| 7,803,740 B2 | 9/2010 | Bicerano et al. |
| 7,918,277 B2 | 4/2011 | Brannon et al. |
| 8,006,760 B2 | 8/2011 | Fleming et al. |
| 8,066,068 B2 | 11/2011 | Lesko et al. |
| 8,119,576 B2 | 2/2012 | Reyes et al. |
| 8,127,850 B2 | 3/2012 | Brannon et al. |
| 8,205,675 B2 | 6/2012 | Brannon et al. |
| 8,408,305 B2 | 4/2013 | Brannon et al. |
| 8,490,700 B2 | 7/2013 | Lesko et al. |
| 8,636,065 B2 | 1/2014 | Lesko et al. |
| 8,757,259 B2 | 6/2014 | Lesko et al. |
| 8,763,699 B2 | 7/2014 | Medvedev et al. |
| 8,936,083 B2 | 1/2015 | Nguyen |
| 9,080,440 B2 | 7/2015 | Panga et al. |
| 9,085,727 B2 | 7/2015 | Litvinets et al. |
| 9,523,268 B2 | 12/2016 | Potapenko et al. |
| 9,670,764 B2 | 6/2017 | Lesko et al. |
| 9,725,645 B2 | 8/2017 | Monastiriotis et al. |
| 9,816,365 B2 | 11/2017 | Nguyen et al. |
| 9,845,670 B2 | 12/2017 | Surjaatmadja et al. |
| 9,863,230 B2 | 1/2018 | Litvinets et al. |
| 9,902,898 B2 | 2/2018 | Nelson et al. |
| 9,909,404 B2 | 3/2018 | Hwang et al. |
| 9,945,220 B2 | 4/2018 | Saini et al. |
| 9,995,125 B2 | 6/2018 | Madasu et al. |
| 10,001,769 B2 | 6/2018 | Huang et al. |
| 10,030,495 B2 | 7/2018 | Litvinets et al. |
| 10,047,281 B2 | 8/2018 | Nguyen et al. |
| 10,077,396 B2 | 9/2018 | Nguyen et al. |
| 10,087,364 B2 | 10/2018 | Kaufman et al. |
| 10,421,897 B2 | 9/2019 | Skiba et al. |
| 10,550,314 B2 | 2/2020 | Liang et al. |
| 2012/0305247 A1 | 12/2012 | Chen et al. |
| 2013/0031971 A1 | 2/2013 | Freese et al. |
| 2013/0161003 A1 | 6/2013 | Mikhailovich et al. |
| 2015/0060064 A1* | 3/2015 | Lafferty .................. E21B 34/14 166/185 |
| 2015/0071750 A1 | 3/2015 | Foster |
| 2015/0101808 A1 | 4/2015 | Saini et al. |
| 2015/0259593 A1 | 9/2015 | Kaufman et al. |
| 2015/0369029 A1* | 12/2015 | Potapenko ............... C09K 8/80 166/177.5 |
| 2016/0139588 A1* | 5/2016 | Huang ................... E21B 43/26 700/275 |
| 2016/0208591 A1 | 7/2016 | Weaver et al. |
| 2017/0066962 A1 | 3/2017 | Ravi et al. |
| 2018/0334612 A1 | 11/2018 | Bulekbay et al. |
| 2019/0345377 A1 | 11/2019 | Haque et al. |

\* cited by examiner

PILLAR FRACTURING

TECHNICAL FIELD

This disclosure relates to pillar fracturing which is hydraulic fracturing of a subterranean formation and forming pillars of proppant in the fractures.

BACKGROUND

Hydraulic fracturing employs fluid and material to generate fractures in a geological formation to stimulate production from oil and gas wells. Hydraulic fracturing is a well-stimulation technique in which rock is fractured by a pressurized fluid that may be a fracturing fluid. The process can involve the hydraulic pressure of fracturing fluid into a wellbore to initiate and propagate fracture in the deep-rock formations where sand and/or proppant may be placed through which reservoir oil, gas, water and pumped fluids will flow more freely. The fracturing typically generates conductive paths that increase the rate at which production fluids, such as crude oil or natural gas, can be produced from the reservoir formations. The amount of increased production may be related to the stimulated reservoir volume. Proppant selection and proppant placement techniques may be enhanced to maintain the conductive fractures as pressure depletes in the well during hydrocarbon production. The selection of appropriate type of proppant may resist formation closure stresses to keep fractures open throughout the producing life. Hydraulic fracturing may allow for the recovery of crude oil and natural gas from unconventional formations that geologists once believed were impossible to produce.

SUMMARY

An aspect relates to a method of hydraulic fracturing, including providing a fracturing fluid through a wellbore into a subterranean formation and hydraulically fracturing the subterranean formation with the fracturing fluid, thereby generating fractures in the subterranean formation. The method includes conveying proppant in the fracturing fluid through the wellbore into the fractures. The method includes intermittently adjusting a characteristic of the fracturing fluid conveying the proppant to form pillars of proppant in the fractures.

Another aspect relates to a system for hydraulic fracturing. The system includes a source of fracturing fluid. The system includes pumps operationally coupled to the source to provide the fracturing fluid through a wellbore into a subterranean formation to hydraulically fracture the subterranean formation to generate fractures in the subterranean formation, wherein the fracturing fluid to convey proppant into the fractures. The system includes a control system to intermittently adjust a characteristic of the fracturing fluid conveying the proppant to form pillars of proppant in the fractures.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
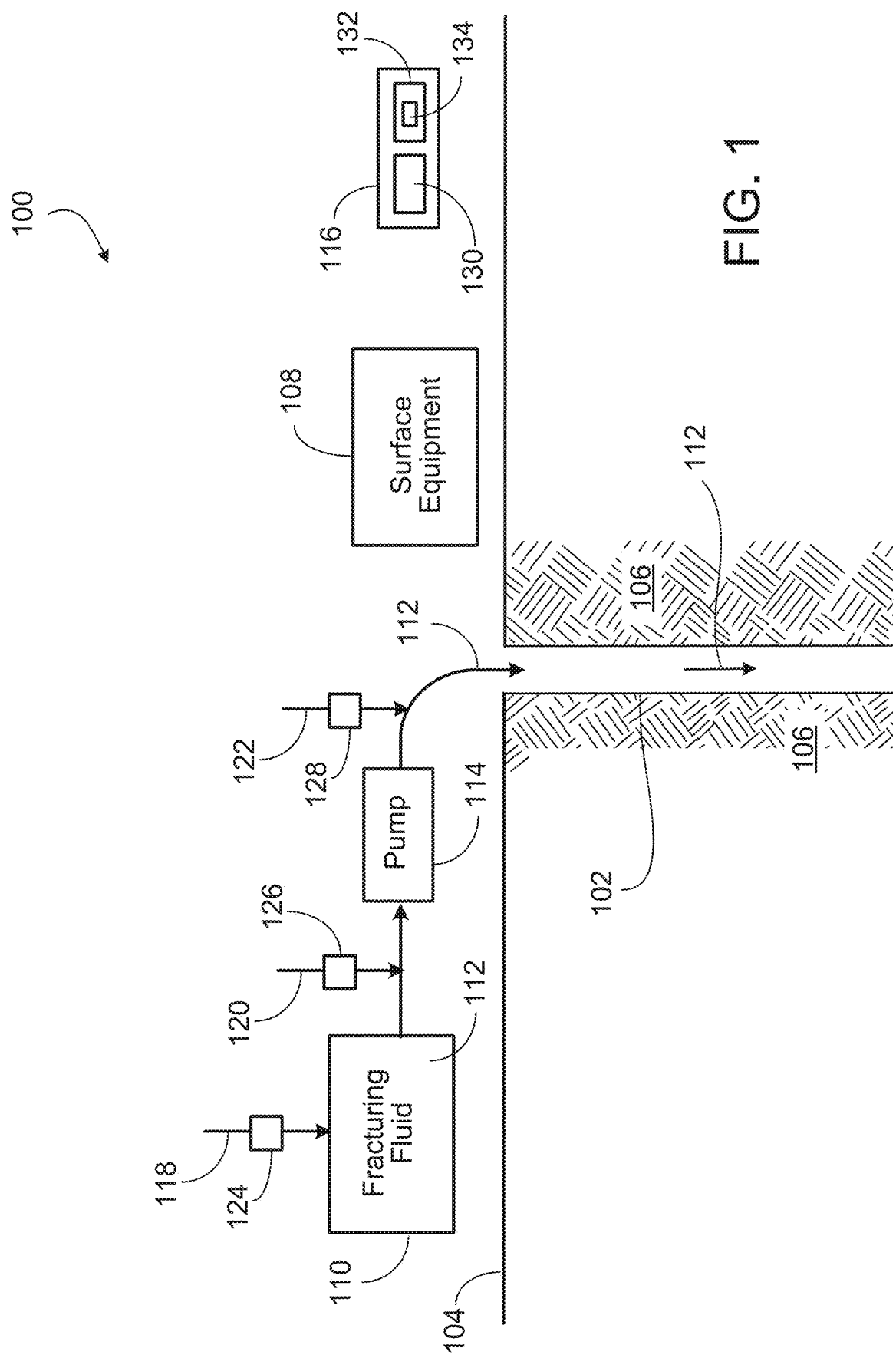
FIG. 1 is a diagram of a well site having a wellbore formed through the Earth surface into a subterranean formation in the Earth crust.

Embodiments of the present techniques involve hydraulic fracturing a subterranean formation with fracturing fluid to generate fractures, and intermittently adjusting a characteristic of the fracturing fluid conveying proppant to form pillars of proppant in the fractures. In implementations, the fracturing fluid is a single type of fracturing fluid. Variables of the fracturing fluid affecting the proppant suspension and transport capacity of the specific fracturing-fluid system may be varied or pulsed to form the pillars.

The present disclosure is generally directed to pillar fracturing. Pillar fracturing may be hydraulic fracturing of a subterranean formation and forming pillars of proppant in fractures. Advanced proppant may be utilized. The proppant may include coated sand, coated ceramics, and other materials as proppants. Some aspects of the present disclosure are directed to repeatedly altering a property (e.g., alternating between values) of the fracturing fluid conveying the proppant to give a segregated distribution of proppant in the fractures to form pillars of proppant in the fractures. The altering of the property may occur, for example, at a frequency at a time interval in the range of 1 minute to 2 hours. Advantageously, in implementations, a single type of fracturing fluid may be employed for the pillar fracturing. Thus, pulsing of two types of fracturing fluids may be avoided in forming the pillars. Instead, a property or characteristic of the fracturing may be alternated between (cycled through) a first value and a second value. The property may be alternated between more than two values.

In certain implementations, the property alternated may be a characteristic of the fracturing fluid, such as a concentration of a component in the fracturing fluid. In some embodiments, the property intermittently adjusted is rheology or rheological property of the fracturing fluid, such as viscosity, viscoelasticity, shear thinning, shear thickening, latent fluid, yield stress fluids, and so forth. Each of these rheology factors may have a different effect on fluid pumping, proppant transport, and suspension of proppant in fluid. Some of these rheological properties may depend on concentration of polymer in fluid and the association of the properties with each other, and the like.

In some implementations, the fracturing fluid is foam fracturing fluid to perform the hydraulic fracturing and convey proppant to the fractures. Embodiments of the present techniques include pillar fracturing through controlled foam quality of the foam fracturing fluid. In particular, the (foam quality may be pulsed or varied, and/or foaming surfactant may be pulsed or varied, and the like. Certain embodiments utilize non-foam fracturing fluid, such as a viscoelastic surfactant (VES) based fracturing fluid. For the example of a VES fracturing fluid, some aspects are directed to achieving proppant pillars through controlled application of VES concentration, brine concentration, or nanoparticles, or any combinations thereof. The "brine concentration" may refer to the salt concentration or salinity of the brine used as a base fluid of the fracturing fluid. The greater the brine concentration of the brine, the greater the salinity of the brine.

An outcome or result with embodiments may include extended propped half-length and solids-free hydrocarbon production along with prompt recovery of pumped fluids. Solids free hydrocarbon production may mean no solids or insignificant quantities of solids (in produced oil/gas/water) that could cause damage to the surface and plant facility equipment. Such solids when present can be formation fines, crushed/uncrushed proppant, other pumped solids additives, etc. The formation of pillars may give high fracture conductivity. The higher the fracture conductivity, the lower is the drawdown pressure to produce the well. The lower the drawdown pressure, the lesser is the total solids production. In some cases, infinite conductivity may be approached with pillar fracturing having significant open space is between pillars. Advanced proppant can further contribute towards enhancing fracturing conductivity and reducing drawdown pressure. Therefore, advanced proppant can also contribute towards achieving solids free production.

For embodiments, the pulsing or intermittent adjusting of a fracturing-fluid property may refer to a single fracturing fluid or single type of fracturing fluid (e.g., foam fracturing fluid) in a given application. In other words, the pulsing or intermittent varying generally does not refer to alternating two different types or stages of fracturing fluid (e.g., VES fluid alternated with a polymer fluid). Instead, a property (e.g., rheology) of the same fracturing fluid or same type of fracturing fluid (e.g., VES fluid) is intermittently adjusted or pulsed. Thus, for a given application, advantageously one type of fracturing fluid (not stages of different types of fracturing fluid) may be employed to form the pillars of proppant. The pillars may be accumulations of proppant in the fractures. Regions or channels in the fracture with less or no proppant may separate the respective pillars.

Foam fracturing fluid may be employed in the hydraulic fracturing and formation of the proppant pillars. The foam fracturing fluid may have a gas phase as an internal phase and a liquid phase as an external phase. The gas in the gas phase may include, for example, nitrogen (N2) or carbon dioxide (CO2), or both. The liquid in the liquid phase may be fresh water or saline water with other additives such as surfactants, clay inhibitors, buffer, gelling agents and the like. The foam fracturing fluid may include a foaming surfactant (foamer) at a specified concentration and a specified foam quality for foam stability to transport proppant along the hydraulic fracture. Foam fluid can also be prepared from gelled or crosslinked fluid e.g., linear guar or crosslinked guar based fluid. Foam quality is the volume percent of gas content in the foam fracturing fluid. Thus, the foam quality may be the volume percent of N2 or CO2, or both, in the foam fracturing fluid. In implementations, the foam quality (FQ) may be, for example, in the range between 52% and 80%. The pillars can be formed by varying FQ or foaming-surfactant concentration, or both. The varying may involve pulsing values for FQ or foaming-surfactant concentration. An example of pulsing foaming agent in a foam system may be in repeating sequence to add (or increased addition) and not add (or decreased addition) foaming agent to the fracturing fluid give the desired repeated upper and lower concentrations of the foaming agent surfactant in the fracturing fluid. The values of FQ (or foaming-agent concentration) to alternate between may be initially determined, for example, via foam rheology tests in the laboratory at downhole conditions.

The time interval (frequency) of the sequence in alternating between the two or more values of FQ may be specified based, for example, on the foam rheology profile at downhole conditions and the subterranean formation (reservoir) transmissibility or permeability. The time interval (frequency) of the sequence may be less in a reservoir with high transmissibility than for a reservoir with low transmissibility. In a gas reservoir, reservoir permeability higher than 5 millidarcy (mD) can be considered a high-permeability reservoir and lower than 0.5 mD can be considered low-permeability reservoir. However, other petrophysics and rock mechanical properties (e.g., porosity, net pay, leak-off height, transmissibility, closure stress, Young's modulus, Poisson's ratio, etc.) may also be considered to calibrate low and high transmissibility reservoirs in a specific field.

Young's modulus and Poisson's ratio may be utilized to determine if the subterranean formation is stiff or ductile. For a stiff subterranean formation, the pillars may be further apart. For a ductile subterranean formation, the pillars may be closer to each other. This consideration of stiff or ductile may contribute to determining and specifying the time interval of the sequence in the alternating or cycling between the two or more values of FQ or other characteristic of the fracturing fluid.

The controlled varying of FQ and/or foaming-surfactant concentration in sequences may segregate proppant as delivered (dropped from suspension) to generate (form) the pillars. The regions between the pillars may generally be conductive and give significant contribution to the conductivity. The pillars of proppant formed may generally be conductive. The pillars themselves may conductive to contribute some conductivity because there may be voids or small channels within a pillar. The conductivity within a pillar is generally less than the conductivity regions between the pillars. The enhanced proppant may increase conductivity within the pillar.

The FQ can be varied, for example, within the foam regime of FQ between 52% and 80% while maintaining the same or similar total downhole pumping rate. An example of pulsing FQ may be stopping gas addition and starting gas addition to the foaming fracturing fluid to give desired lower and upper values of FQ during the treatment. In a foam system, the FQ can be varied by increasing or decreasing gas rate to the fracturing fluid and decreasing or increasing liquid rate to the fracturing fluid for the same or different total downhole rate of the fracturing fluid. The FQ adjustments can be performed on the fly. To control FQ, the addition rate of gas (e.g., N2 or CO2) injected into the fracturing fluid as the fracturing fluid is being pumped may be adjusted. A liquid (water) addition rate to the fracturing fluid may be adjusted to control FQ. Some examples of controlling FQ include: (1) increasing gas rate and decreasing liquid rate (FQ will increase and same total downhole rate can be maintained); (2) increasing liquid rate and decreasing gas rate (FQ will decrease and same total downhole rate can be maintained); (3) increasing liquid and gas rate (total downhole rate will be increased, while FQ can be maintained the same); and (4) decreasing liquid and gas rate (total downhole rate will be decreased, while FQ can be maintained the same). Other examples may involve increasing and decreasing the surfactant concentration to alternate between stable foam and less-stable foam (e.g., low-stable foam or unstable foam) while maintaining the gas concentration generally constant. This may alter rheology of fluid in the cycle and thus alternate the proppant carrying capacity in the cycle to form pillars.

For embodiments in which a VES-based fracturing fluid is employed, the VES-based fracturing fluid may suspend and carry proppant due to viscous and elastic properties of VES including with brine (salt). VES-based hydraulic fracturing fluids may be a cleaner alternative to polymer-based systems. For the VES-based fracturing fluid, the VES concentration, brine (salt) type, and brine (salt) concentration may be specified. Specifying the salt concentration in the brine incorporated into the fracturing fluid may give a specified salt concentration in the fracturing fluid. Further, the addition of microparticles or nanoparticles can further influence the proppant suspension capacity of the VES-based fracturing fluid including at high temperature (e.g., above 300° C.). High temperature may be significant in relation to the presence of microparticles and/or nanoparticles. In general, the viscosity profile can be significantly enhanced at higher temperatures with use of microparticles or nanoparticles, for example. Microparticles and nanoparticles in some cases provide stability to wormlike micelles present in the VES fluid and thus the fluid stability at higher temperature. There may be interactions between charges on surfactant and particle that behave as crosslinking mechanism to give stability of micelles.

For applications utilizing VES fracturing fluid, one or more of the following actions or variables can be varied (pulsed) to segregate proppant in a controlled manner to create conductive pillars during hydraulic fracturing: (1) concentration of VES in the fracturing fluid, (2) salt concentration of brine (or brine substitute) incorporated in the fracturing fluid, and (3) addition of microparticles or nanoparticles. The concentration of brine is the concentration of salt in the brine, e.g., the salinity of the brine. This brine concentration (brine salinity) can be as low as in a range of 500 ppm to 2000 ppm salt in fresh water up to as much as 40 wt % salt concentration in water. Brine may an additive incorporated into the fracturing fluid at the Earth surface. Brine may be utilized to formulate VES fluids system on surface. Brine may generally be water with salt. Brine may be formed by adding salt to water. For instance, when potassium chloride (KCl) salt is added to water, the formed brine may be labeled as KCl brine. In that instance, depending on KCl concentration, the brine may be named accordingly (e.g., 6% KCl brine, 10% KCl brine, etc.). Altering the salt concentration in the brine incorporated into the fracturing fluid alters the salt concentration in the fracturing fluid.

The pulsing/varying of the above mentioned variables (1), (2), and (3), and other variables, may affect the proppant suspension capacity by altering viscoelasticity or viscosity. In the portions or intervals of the sequence in which viscosity is reduced, the specifying of the aforementioned variables may break long wormlike micelles into spherical shapes in the VES-based fracturing fluid during those intervals of the sequence and in a controlled manner. The proppant suspension capacity may be the amount proppant that the fracturing fluid can carry without screen out. Screen out may mean that when the fracturing fluid cannot carry all of the proppant, proppant settles out of the fracturing fluid while being pumped, plugging the piping and perforations and causing the fracturing job to stop. Generally, proppant suspension capacity or transport of proppant in fluid may be given in mass of proppant per volume of fluid. In static conditions for some carrying fluids, the proppant can settle at lower concentration or more quickly with the carrying fluid at static conditions. The proppant may settle at greater concentration or less quickly during pumping of the carrying fluid.

When VES is added into water, the VES molecules may associate into structures called micelles. In the presence of desired or optimum brine concentration (e.g., beneficial values of KCl concentration, CaCl2) concentration, etc.), the micelles may become a rodlike shape. If the VES is present is sufficient concentration, the micelles associate with each other. The resulting hindered movement make the fracturing fluid both viscous and elastic that suspends and carry proppant during the fracturing treatment. VES fluids are typically sensitive to temperature. The settling of proppant should be generally be less during pumping and until fracture closes on proppant after pumping.

It should be understood that the phrase "VES fluid" may generally refer to a "VES-based fluid" in that the "VES fluid" contains more than a VES. Similarly, the phrase "VES hydraulic fracturing fluid" generally refers to "VES-based hydraulic fracturing fluid" in that the hydraulic fracturing fluid. In addition to having VES, a VES-based hydraulic fracturing fluid may have other additives, such as clay inhibitors, buffers, scale inhibitors, biocide, polymers, cross-linking agents, nanoparticles, breaker, etc. Further, a VES-based fluid having the VES may include mono or multivalent brine as a base fluid. The VES-based fluid having the VES may include water as a base fluid with salt (e.g., mono or multivalent salt) added.

The brine concentration (brine salinity) may be adjusted. For VES fracturing fluid, different concentrations (e.g., typically two concentrations) of brine may be utilized. One concentration may give viscous and elastic properties, while the other concentration may be higher or lower brine concentration to provide lesser suspension capacity of proppant to allow desired proppant settlement to create pillars. This adjustment of viscoelastic properties and formation of pillars can also be implemented with VES concentration (VES) in the fracturing fluid. The brine may typically be batch-mixed with the fracturing fluid. Generally, other additives (e.g., VES, nanoparticles, stabilizer, breaker, crosslinker, etc.) can be added on-the-fly to the fracturing fluid.

For both non-foam fracturing fluids (e.g., VES fracturing fluid) and foam fracturing fluids, the effect of intermittently changing (pulsing) a fracturing-fluid property may be correlative with the transmissibility of the subterranean formation. In particular, the impact of periodically adjusting (pulsing) the fracturing-fluid property (and proppant pulsing) on fracturing-fluid proppant concentration and the magnitude of proppant segregation may depend on the transmissibility or permeability of the subterranean formation (reservoir). The transmissibility or permeability may typically be determined from mini-fall-off tests. A mini-fall-off test (or minifrac test) may be an injection-falloff diagnostic test performed without proppant before a main fracture stimulation treatment. The intent may be to break down the formation to create a short fracture during the injection period, and then to observe closure of the fracture system during the ensuing falloff period.

Again, the aforementioned variables associated with the fracturing fluid may be affected by (correlative with) transmissibility or permeability of the formation. In a subterranean formation with high transmissibility, the proppant segregation mechanism may be less aggressive and proppant pulsing sequence less frequent. For tight or low transmissibility in the subterranean formation, the proppant segregation mechanism may be more aggressive and proppant pulsing more frequent. Transmissibility may be the flow conductivity of the formation corrected for viscosity of the flowing fluid. Transmissibility may be the product kh of permeability (k) and thickness (h) divided by fluid viscosity. In particular, an equation for transmissibility may be $kh/\mu$, where k is formation permeability, h is the producing formation thickness (h) in a producing well, and $\mu$ is viscosity.

Embodiments may be directed to pillar fracturing and flow-conductivity enhancement in a subterranean formation that is a high-stress reservoir (e.g., having stress and stress gradient greater than 10,000 pounds per square inch (psi) and 0.7 psi per foot. Conductivity enhancement may be achieved at least through: (1) proppant segregation to create conductive inter-pillar channels in low-transmissibility formations; (2) increased width and generation of high net pressure in high-transmissibility formations; (3) periodic varying or pulsing (with zero or negligible sand/proppant concentration) to further stabilize conductive channels and facilitate fracture placement; and (4) nanocomposite resin and ceramic matrix coating of sand and proppant. The ceramic matrix coating includes a ceramic matrix composite (CMC). The inclusion of alkyl fluoro-silanes as low surface-energy modifier to proppant including nanocomposite resin and CMC coating may expedite recovery of pumped fluids, prevent or reduce water block, and further enhance fracture conductivity.

Proppant having advanced coating may be utilized. The advanced coating may include nanocomposite resin coating, ceramic coating with ceramic matrix composite (CMC), and other coatings. The underlying proppant particle having the coating may be ceramic, metal, sand, and so on. In some embodiments, the proppant may be sand coated with ceramic. The crush resistance strength, unconfined compressive strength (UCS), and retained permeability of sand and proppant can be increased by advanced coating technology including nanocomposite resin and CMC. These resin-coated sands (RCS) and resin-coated proppants (RCP) may generally reduce the proppant bulk density as light-weight nanocomposite coating and filler materials are introduced. This reduction in proppant bulk density may further increase the suspension capacity of the RCS and RCP. Fines migration may be controlled or reduced by employment of proppant (or sand) coated with the advanced nanocomposite resin or ceramic matrix coating. Advanced coating can also be done on the fly with resins such as novolac, Resole, epoxy, urethane and others. In subterranean environment they will make particle aggregate and fuse to form pillars. Coated proppant can have curable resins which in formation may form pillars with good strength.

With the fracturing fluid conveying proppant, RCS, or RCP to the fractures, the fracturing fluid can be applied at intermittent periods (pulsed) with negligible proppant concentration. This may further increase fracture conductivity and potential for fracture placement without screen-out especially in completion with limited bottom hole pressure tolerance. The fracture placement may refer to the designed volume of sand, proppant, RCS, or RCP placed in the formation within surface and bottomhole pressure limits and without premature screen-out. Screen-out may be a condition (e.g., bridging of proppant across casing perforations and/or in the hydraulic fracture) giving a restriction to flow of fracturing fluid and thus causing an increase in surface and bottom hole treatment pressure that often forces to prematurely terminate the fracturing treatment.

For the various fracturing fluids and adjustments of various characteristics of the fracturing fluid discussed herein for the formation of pillars, the proppant in a given fracturing fluid at different rheology should aggregate at different places in the fracture. Also, for stability of pillars the proppant should agglomerate. One technique of agglomeration is to make proppant adequately hydrophobic so that the proppant agglomerates and then fuses with pressure and temperature from the subterranean formation. Some resins as proppant coating can be used to promote that proppant agglomerate and form stable pillars. Sticky resin or tackifier as proppant coating can be used in implementations to agglomerate proppant in the proppant pillar.

For a given fracturing fluid, proppant in one rheology fluid may form one pillar and proppant in other rheology fluid may form another pillar at different depth due to different settling rate/velocity. For pillars to form, the fracturing fluid should suspend the proppant during the duration of conveyance and then when the fracture closes, the fracture closing may generally maintain pillars in place throughout the fracture. Settling of the proppant to the bottom should generally be avoided during the pumping. To prevent or reduce complete settling, degradable materials can be added to the fracturing fluid (e.g., any of the fracturing fluids discussed herein) as sacrificial material to keep proppant pillars suspended in the fracture before the formation closes. In some cases, fibers can be utilized as the degradable material. This implementation of degradable materials is application for the fracturing fluids (e.g., VES-based fracturing fluid, foam fracturing fluid, etc.) presented in this disclosure.

As mentioned, pillar fracturing may be implemented through controlled foam quality and utilizing advanced proppant and sand coating. Pillar fracturing can also be achieved with non-foam fracturing fluid, such as with VES-based fracturing fluid through controlled application of concentrations in the VES fracturing fluid of the VES, brine, microparticles, and nanoparticles. The techniques may give extended propped half-length, substantially solids-free hydrocarbon production, and relatively rapid recovery of pumped fluids. This may enhance the proppant transport capacity deeper into the fracture resulting in longer conductive propped half-length. The recovery of the pumped fluid (e.g., fracturing fluid) as flowback may be more rapid due to better conductivity provided by the segregated accumulation of proppant (proppant pillars) compared to conventional distribution of proppant in the fractures. Moreover, the density of the proppant coated with nanocomposite resin or density of the proppant coated with ceramic having CMC can be lower than density of high strength proppant (HSP) and intermediate strength proppant (ISP) while giving advantage of increased crush resistance and conductivity. Conductivity of the proppant may be as retained permeability of the proppant at width of proppant. In pillar fracturing, the total conductivity is improved (e.g., to include the flow conductivity between the pillars and within the pillars). The produced-hydrocarbon flow conductivity includes flow in regions between the pillars of proppant, between proppant in a proppant pillar or proppant pack, and between proppant and the formation, and so on. Further, embodiments may resolve the condensation banking problem due to application of nano-functionalized coated proppant that reduces the interfacial tension in the proppant pack in the pillars and prevents or reduces condensate and water blockage in the near-wellbore area. Condensate banking may be the buildup of condensate around the wellbore that reduces relative permeability and therefore reduces gas production.

As indicated, conventionally the conductivity of proppant may be defined as retained permeability of the proppant multiplied by the width of proppant. Yet, in cases of pillar fracturing, the total conductivity is increased and may generally include the flow conductivity between the pillars and within the pillars. Typically, conventional resin coating reduces permeability when compared to the proppant substrate. The advance coating technology may be aimed to maintain or enhance permeability than the substrate or to limit permeability reduction when compared to the conventional resins. Resin coated proppant may have lower conductivity than bare proppant. Yet, under stress the proppant crushes and generates fines. These fines travel and block the pore space between proppant and reduce permeability and thus conductivity. For instance, 5% of fines can reduce conductivity by more than 70%. Resin coated proppant may maintain the crushed fines in the sack and limit travel in proppant pack and not accumulating in pore space. Thus, conductivity of resin coated proppant can be higher. In implementations, conductivity may come from the intestinal spaces between the proppant particles and generally not the porosity of proppant particles.

As discussed, for a particular hydraulic-fracturing or pillar-fracturing application, the pulsing or intermittent adjusting of a fracturing-fluid property may refer to a single-type fracturing fluid. In implementations, the pulsing or intermittent adjusting generally does not refer to alternating two types of fracturing fluid. Instead, a property, characteristic, attribute, or quality of the particular fracturing fluid is intermittently adjusted or pulsed to form the pillars of proppant in the fractures for a given application. In implementations, the intermittent adjustments can be made online, including on-the-fly, as the fracturing fluid is being pumped into the wellbore. Examples of the single type of fracturing fluid for a given pillar-fracturing job include foam fracturing fluid, VES-based fracturing fluid (water-based and can be polymer free), water-based polymer fracturing fluid, oil-based fracturing fluid, etc.

For applications of foam fracturing fluid, the foam fracturing-fluid property or characteristic intermittently adjusted (altered) to form the pillars may be viscosity or foam stability, or both. The FQ may affect the viscosity. Further, the concentration of foaming surfactant in the foam fracturing fluid may affect the foam stability. Indeed, foaming surfactant may be added to the foam fracturing fluid to promote foam stability. The FQ and foaming-surfactant concentration may affect foam stability (and viscosity) and thus may affect proppant suspension and settling velocity (units of distance per time). Implementing alternating values for FQ or foaming-surfactant concentration in the foam fracturing fluid conveying the proppant may alternate between greater ability and less ability of the foam fracturing fluid to suspend and transport proppant. Thus, implementing alternating FQ values or alternating foaming-surfactant concentration values during the conveying of the proppant by the foam fracturing fluid into the fractures may form pillars of the proppant in the fractures.

As mentioned, the FQ may affect viscosity. The intermittent adjustments may repeatedly cycle through (a) the foam fracturing fluid having a first FQ and (b) the foam fracturing fluid having a second FQ different than the first FQ. This in turn may form pillars because the proppant suspension or settling velocity at the first FQ may be different than the proppant suspension or settling velocity at the second FQ.

The second FQ is different than the first FQ for the pillars to form. The difference may vary well-by-well based on laboratory tests at bottom hole static and cool down conditions, surface and bottom hole pressure limitations, type of liquid phase and remaining pumping time, etc. Moreover, the intermittent adjustment may be made with more than two FQ values to maintain effective rheology contrast (e.g., based on dynamic condition during pumping, such as formation cooldown and remaining pumping time) to form pillars of proppant. In implementations, the amount of proppant in the pumped fracturing fluid (proppant concentration in the pumped fracturing fluid) may be maintained generally constant during the varying of FQ.

The FQ may be adjusted by adding gas (e.g., N2, CO2, etc.) or liquid (e.g., water/brine) to the foam fracturing fluid. The FQ of the foam fracturing fluid can be a property or characteristic of the foam fracturing fluid conveying the proppant that is intermittently adjusted (e.g., with alternating values) to affect proppant suspension to form proppant pillars in the fractures. The alternating between FQ values may give segregation in the distribution of the proppant in the fractures.

As indicated, concentration of foaming surfactant in the foam fracturing fluid may affect the foam stability of foam fracturing fluid. The foam stability of the foam fracturing fluid may affect the proppant suspension and settling velocity of the foam fracturing fluid. To form pillars of proppant in the fractures, the intermittent adjustments to the foam fracturing fluid conveying the proppant may repeatedly cycle through (a) a first concentration of foaming surfactant and (b) a second concentration of foaming surfactant different than the first concentration. This may form pillars because the proppant suspension or settling velocity at the first concentration of foaming surfactant may be different than the proppant suspension or settling velocity at the second concentration of foaming surfactant. The foaming-surfactant concentration in the foam fracturing fluid can be a characteristic of the foam fracturing fluid conveying the proppant that is intermittently adjusted (e.g., with alternating values) to affect proppant suspension to form proppant pillars in the fractures. The alternating between foaming-surfactant concentration values may segregate accumulations of proppant in the fractures. The intermittent adjustments may implement more than two concentrations of foaming surfactant to give rheology contrast in the fracturing fluid to form pillars of proppant. Considerations may include, for example, dynamic condition during pumping, such as formation cooldown and remaining pumping time.

The foam fracturing fluid may include foaming surfactant at specified concentrations and FQ at specified percentages for foam stability to transport proppant along the hydraulic fractures. As mentioned, the pillars can be formed by varying FQ or foaming-surfactant concentration, or both. Stability and half-life of the foam can impact the formation of pillars. Foam that can last for longer time and have tunable FQ or viscosity may be beneficial. The stability of foam fracturing fluid may be increased by addition of nanoparticles or microparticles, or both. To form pillars of proppant in the fractures, the intermittent adjustments to the foam fracturing fluid conveying the proppant may repeatedly cycle through (a) a first concentration of nanoparticles (or microparticles) and (b) a second concentration of nanoparticles (or microparticles) different than the first concentration. The intermittent adjustments may implement more than two concentrations of the nanoparticles (or microparticles) in the fracturing fluid to give rheology contrast in the fracturing fluid to form pillars of proppant. The number of particle concentrations applied in the cycling may be based in part on the dynamic condition during pumping of the fracturing fluid, such as formation cooldown and remaining pumping time.

The concentration of nanoparticles (or microparticles) in the foam fracturing fluid can be a characteristic of the foam fracturing fluid conveying the proppant that is intermittently adjusted (e.g., with alternating values) to affect proppant suspension to form proppant pillars in the fractures. The alternating between the particles concentration values may provide for accumulations of proppant that are segregated in the fractures. The condition of the foam may be intermittently adjusted to segregate distribution of the conveyed proppant in the fractures to form pillars by varying the particle concentration, gas volume (FQ), and foaming surfactant (foamer) concentration. Varying or pulsing of FQ may be, for example, between zero (no gas phase, FQ=0%) and a specific or non-zero value (e.g., FQ=55%). The amount of proppant utilized may be, for example, 0% to 50% less than the amount employed in traditional fracturing. The less proppant utilized may avoid fully filling the fracture so to form pillars having adjacent open-channel space. Therefore, in embodiments, the amount of fluid pumped will be the same as in traditional fracturing but amount of proppant used will be 0-50% lower.

For applications of VES-based fracturing fluid, the VES fracturing-fluid property intermittently adjusted to form the pillars may be viscoelasticity or viscosity. The viscoelasticity or viscosity may affect the settling velocity. Implementing alternating values for viscosity (or viscoelasticity) of the VES fracturing fluid may alternate the proppant suspension and proppant settling velocity of the VES fracturing fluid. This controlled varying of viscosity in sequences may segregate proppant as delivered and distributed in the fractures. Thus, implementing alternating viscosity (or viscoelasticity) of the VES fracturing fluid during the conveying of the proppant by the VES fracturing fluid into the fractures may form pillars of the proppant in the fractures. The intermittent adjustments may repeatedly cycle through (a) a first condition of the VES fracturing fluid having a first viscosity and (b) a second condition of the VES fracturing fluid having a second viscosity different than the first viscosity. This in turn may form pillars because the proppant suspension or settling velocity at the first viscosity may be different than the proppant suspension or settling velocity at the second viscosity. In these implementations, the second viscosity is different than the first viscosity for the pillars to form. The magnitude of the different may well-by-well based, for example, on laboratory tests (e.g., rheology profile determined by HPHT rheometer, fluids leak off, etc.) at bottom hole static and cool down conditions, surface and bottom hole pressure limitations, and remaining pumping time, etc. In addition, viscosity should generally be above screenout value. Fluids rheology profiles (based on static and dynamic conditions) may be entered into the fracture simulator. The viscosity contrast may be improved or optimized considering variables such as pump rate, fracturing fluid efficiency, physical properties of proppants, stage proppant concentration, pumping time, fracture closure time, and so forth.

The viscosity of the VES fracturing fluid conveying the proppant can be changed by changing the VES concentration in the VES fracturing fluid. Increasing VES concentration will generally increase the viscosity. Decreasing the VES concentration will generally decrease the viscosity. The intermittent adjustments may repeatedly cycle through a first concentration of VES in the VES fracturing fluid and a second concentration of the VES in the VES fracturing fluid that is different than the first concentration. Such may form pillars in the fractures. The VES concentration in the VES fracturing fluid can be a characteristic of the VES fracturing fluid that can be intermittently adjusted (e.g., with alternating values) to affect proppant suspension to form proppant pillars in the fractures. The alternating between VES concentration values may accumulate proppant in regions of the fractures and provide separation between the accumulations.

Viscosity of the VES fracturing fluid conveying the proppant can also be affected by addition of microparticles or nanoparticles to the VES fracturing fluid. Increasing concentration of microparticles or nanoparticles may generally increase the viscosity of the VES fracturing fluid. Decreasing the concentration of the microparticles or nanoparticles may generally decrease the viscosity. The intermittent adjustments (pulsing) may repeatedly cycle through a first concentration of microparticles or nanoparticles in the VES fracturing fluid and a second concentration of the microparticles or nanoparticles in the VES fracturing fluid that is different than the first concentration. This may facilitate the forming of pillars of proppant in the fractures. As mentioned, the intermittent adjustments may be made with more than two concentrations of microparticles or nanoparticles to maintain optimum or beneficial rheology contrast (e.g., based on dynamic conditions during pumping such as formation cooldown and remaining pumping time, and the like) to form pillars of proppant. The concentration of microparticles or nanoparticles in the VES fracturing fluid can be a characteristic of the VES fracturing fluid that can be intermittently adjusted (e.g., alternating values for the concentration) to affect proppant suspension to form proppant pillars in the fractures. The alternating between particle concentration values may give segregated distribution of proppant in the fractures to form the pillars.

The viscosity of the VES fracturing fluid conveying the proppant can be altered by changing brine concentration (salinity) of the brine incorporate into the VES fracturing fluid. Increasing the brine salinity to increase salt concentration in the VES fracturing fluid may generally increase the viscosity of the VES fracturing fluid. Decreasing the brine salinity to decrease the salt concentration in the VES fracturing fluid may generally decrease the viscosity. Intermittent adjustments may repeatedly cycle through a first concentration of salt in the VES fracturing fluid and a second concentration of salt in the VES fracturing fluid that is different than the first concentration. This may form pillars in the fractures. The salt concentration in the VES fracturing fluid can be a property or characteristic of the VES fracturing fluid that can be intermittently adjusted (e.g., having alternating values of salt concentration) to affect proppant suspension to form proppant pillars in the fractures.

Furthermore, the intermittent adjustments may alternate between different types of salt to affect viscosity to promote segregated distribution of proppant in the fractures to form pillars of proppant in the fractures. For instance, a first type of salt may be a monovalent salt (e.g., giving monovalent ions such as sodium Na ions or potassium K ions) and the second type of salt may be multivalent salt (e.g., giving multivalent ions such as calcium Ca+2 ions). In some cases at the same salt concentration in the VES fracturing fluid, multivalent Ca+2 ions may give greater viscosity of the VES fracturing fluid than monovalent Na or K ions. The VES salt type in the VES fracturing fluid can be a characteristic of the VES fracturing fluid that can be intermittently adjusted (alternated) to affect proppant suspension to form proppant pillars in the fractures.

As indicated, for the formation of pillars, the proppant in the lower viscosity and higher viscosity should aggregate at different places. Moreover, for stability of pillars, the proppant should agglomerate. One technique of agglomeration is to make proppant hydrophobic enough so that the proppant agglomerate via hydrophobic interaction and then fuse at pressure and temperature of the subterranean formation. The proppant may have a hydrophobic coating. The proppant hydrophobic coating may bind together proppant as an agglomerate. Further, some resins can be utilized to make proppant agglomerate and form stable pillars. Sticky resins can be used to agglomerate proppant in a proppant pillar.

Furthermore, proppant in one viscosity fluid may form one pillar and proppant in another viscosity fluid may form another pillar at a different depth (e.g., in a vertical fracture) due to different settling rate/velocity. For pillars to form the fluid should suspend the proppant during the duration of fracturing and then when the fracture closes, the fracture closing may generally keep pillars in place throughout the fracture. It may be desirable that the proppant not settle to the bottom during the pumping. To prevent or reduce complete settling, suspending agents (e.g., degradable materials) can be added to the fluid as sacrificial material to keep proppant pillars suspended in the fracture before the formation closes. In some cases, fibers can be used as the degradable material. The degradable material may be in the form of fiber or particles. This implementation of degradable materials is applicable for both VES fracturing fluid and foam fracturing fluid, and other fracturing fluids.

The intermittent adjustments to the VES-based fracturing fluid can be to alternate between (a) addition of a crosslinker and (b) no addition of a crosslinker. The VES fracturing fluid can have a polymer component with presence of the crosslinker. The crosslinker in the VES-based fluid can give stable fluid in viscosity. The varying of the crosslinker concentration can give different quality of the VES fluid. An example of the VES crosslinker is dicarboxylic acids (e.g., tartaric acid) which crosslink a headgroup (e.g., amine headgroup) of VES surfactants The intermittent adjustments may repeatedly cycle through a first concentration of crosslinker in the VES fracturing fluid and a second concentration of the crosslinker in the VES fracturing fluid that is different than the first concentration. Such may form pillars of proppant in the fractures due to the effect of the changing viscosity of the VES fracturing fluid on the conveyed proppant distribution in the fractures. The alternating between crosslinker concentration values may give segregated distribution of proppant in the fractures to form the pillars. Often, the intermittent adjustments may be made with more than two concentrations of crosslinker to maintain optimum or beneficial rheology contrast (based on dynamic conditions during pumping such as formation cooldown, remaining pumping time, etc.) to form pillars of proppant.

Oil-based fracturing fluid is a non-foam fracturing fluid. The oil-based fracturing fluid can convey proppant to form pillars. The oil-based fracturing fluid may be a viscous gelled oil system. The oil gels of the oil-based fracturing fluid can be formed, for example, by phosphonate esters and crosslinked by metal ions such as iron. Proppant suspension or setting rate can be altered to form pillars by varying the quality of the oil gel, such as by intermittently adjusting the concentration of the crosslinker metal ions. The periodic adjustments may repeatedly cycle through a first concentration of crosslinker metal ions in the oil-based fracturing fluid and a second concentration of the crosslinker metal ions in the oil-based fracturing fluid that is different than the first concentration. Such may form pillars of proppant in the fractures. Three or more values for concentration of the crosslinker metal ions may be implemented in the cycling adjustments. The concentration of crosslinker metal ions may be a characteristic of the oil-based fracturing fluid that can be intermittently adjusted (pulsed) to form pillars of proppant in the fractures in the subterranean formation. Proppant pulsing with the emulsion fracturing fluid can also be additionally performed to form the pillars, such in combination with the aforementioned techniques.

Emulsion (emulsified) fracturing fluid is a non-foam fracturing fluid that can perform hydraulic fracturing and can convey proppant through the wellbore into the hydraulic fractures in the subterranean formation to form pillars of proppant in the fractures. The emulsion fracturing fluid can include a mixture of viscosified water and oil. The oil may be, for example, mineral oil. The emulsified fluid system can be stabilized with emulsifying surfactant (emulsifier), microparticles, or nanoparticles, or any combinations thereof. The emulsified fluid system can have high viscosity and desired proppant suspension capacity. The emulsion fracturing fluid can provide for fluids-loss control and generally less formation damage. The quality and proppant suspension of the emulsion fracturing fluid may be impacted by: (a) the concentration of the emulsifying surfactant (emulsifier) in the emulsion fracturing fluid; (b) the ratio (e.g., mass ratio or volume ratio) of water to oil in the emulsion fracturing fluid; (c) the concentration of microparticles or nanoparticles, or both, in the emulsion fracturing fluid; and (d) the salt concentration or brine concentration in the emulsion fracturing fluid. These characteristics (a), (b), (c), and (d) of the emulsion fracturing fluid can be intermittently varied to form pillars in the fractures. Pillars can be created through controlled proppant suspension and settling velocity with at least one or more of the following actions: (1) varying ratio of the viscosified water and oil; (2) varying concentration of the emulsifier; (3) varying concentration of microparticles and/or nanoparticles; and (4) varying salt concentration or brine concentration. The salt concentration or brine concentration may affect viscosity of the water and thus affect viscosity of the emulsion. Also, the intermittent adjustments may involve varying concentration of internal phase in the emulsion fracturing fluid. The greater the internal-phase concentration, generally the greater the viscosity of emulsion. Also, the viscosity may depend on emulsion droplet size. Smaller size droplet may give more viscosity than bigger droplet size. Invert emulsion can gives more viscosity for proppant suspension but also result in more friction (greater pressure drop) when pumping the fracturing fluid through pipes.

A foamed-emulsion fracturing fluid may be employed in the hydraulic fracturing and to convey proppant into the fractures to form pillars of proppant. To form the foamed emulsion, oil (e.g., mineral oil) and gas (e.g., N2 or CO2) may be dispersed in water. In the foamed emulsion, the water may be the external or continuous phase. The oil and gas may each be respective internal or discontinuous phases in or dispersed in the water that is the continuous phase. Thus, the internal phase of the foamed emulsion can be two respective internal phases including an oil phase and a gas phase (e.g., CO2 or N2). Surfactant in the foamed-emulsion fracturing fluid may facilitate formation of fracturing fluid as foamed-emulsion with the water as the continuous phase. Characteristics or variables of the foamed-emulsion fracturing fluid that may be intermittently varied to form the pillars may include ratio of water and oil, ratio of water and gas, FQ, and concentration of surfactant.

FIG. 1 is a well site 100 having a wellbore 102 formed through the Earth surface 104 into a subterranean formation 106 in the Earth crust. The subterranean formation 106 may be labeled as a geological formation, a reservoir formation, a reservoir, a rock formation, or a hydrocarbon formation, and the like. The subterranean formation 106 may be a conventional or unconventional formation to be subjected to hydraulic fracturing and in which pillars of proppant are formed in the hydraulic fractures. Thus, pillar fracturing may be performed.

The wellbore 102 can be vertical, horizontal, or deviated. The wellbore 102 can be openhole but is generally a cased wellbore. The annulus between the casing and the formation 106 may be cemented. Perforations may be formed through the casing and cement into the formation 106. The perforations may allow both for flow of fracturing fluid and proppant into the subterranean formation 106 and for flow of produced hydrocarbon from the subterranean formation 106 into the wellbore 102. The surface equipment 108 may also include equipment to support the hydraulic fracturing.

The well site 100 may have a hydraulic fracturing system including a source 110 of fracturing fluid 112 at the Earth surface 104 near or adjacent the wellbore 102. The source 110 may include one or more vessels holding the fracturing fluid 112. The fracturing fluid 112 may be held in vessels or containers on ground, on a vehicle (for example, truck or trailer), or skid-mounted. The fracturing fluid 110 may be, for example, water-based or oil-based.

The hydraulic fracturing system at the well site 100 may include motive devices such as one or more pumps 114 to pump (inject) the fracturing fluid 112 (with or without proppant) through the wellbore 102 into the subterranean formation 106. The pumps 114 may be, for example, positive displacement pumps and arranged in series or parallel. Again, the wellbore 102 may be a cemented cased wellbore and have perforations for the fracturing fluid 112 to flow (injected) into the formation 106. In some implementations, the speed of the pumps 114 may be controlled to give desired flow rate of the fracturing fluid 112. The system may include a control device to modulate or maintain the flow of fracturing fluid 112 into the wellbore 102 for the hydraulic fracturing and forming the pillars. The control device may be, for example, a control valve(s). In certain implementations, as indicated, the control device may be the pump(s) 114 as a metering pump in which speed of the pump 114 is controlled to give the desired or specified flow rate of the fracturing fluid 112. The set point of the control device may be manually set or driven by a control system, such as the control system 116.

The pump 114 may be operationally coupled to the source 110 to provide the fracturing fluid 112 through the wellbore 102 into the subterranean formation 106 to hydraulically fracture the subterranean formation 106 to generate fractures in the subterranean formation 106 and form pillars of proppant in the fractures. The pump 114 may pump the fracturing fluid 112 conveying proppant into the generated fractures to form the pillars of proppant in the fractures. In some examples, the fracturing fluid 112 may be initially pumped without proppant (a clean rate) during a beginning portion of the hydraulic fracturing, and subsequently pumped with proppant (a slurry rate) in a subsequent portion of the hydraulic fracturing to form the pillars in the fractures. The fracturing fluid 112 without proppant may hydraulically fracture the subterranean formation 106. The fracture fluid 112 with the proppant may hydraulically fracture the formation 106 and increase width of hydraulic fractures generated by the fracturing fluid 112 without proppant.

For some embodiments, the fracturing fluid 112 in the source 110 vessel may have all components of the fracturing fluid 112. In other embodiments, not all components of the fracturing fluid 112 are included in the source 110 vessel. In certain embodiments, some components of the fracturing fluid 112 may be added to the source 108 vessel near or at the time (or during) the pumping of the fracturing fluid 112 into the wellbore 102 for the hydraulic fracturing. Concentrations of components in the fracturing fluid 112 may be adjusted during the hydraulic fracturing and pillar formation. In embodiments, at least one component of the fracturing fluid 112 is added to the conduit conveying the fracturing fluid 112 either on the suction side of the pump 114 or discharge side of the pump 114, or both, as the fracturing fluid 112 is being pumped into the wellbore 102.

The fracturing fluid 112 may be prepared (formulated and mixed) offsite prior to disposition of the fracturing fluid 112 into the source 110 vessel at the well site 100. A portion (some components) of the fracturing fluid 112 may be mixed offsite and disposed into the source 110 vessel and the remaining portion (remaining components) of the fracturing fluid 112 added to the source 110 vessel or to a conduit conveying the fracturing fluid 112. The fracturing fluid 112 may be prepared onsite with components added to (and batch mixed in) the source 100 vessel. Components may be added online to the source 110 vessel or to a conduit conveying the fracturing fluid 112 during the hydraulic fracturing and conveying of proppant.

The illustrated embodiment includes three addition points 118, 120, and 122 for introducing components to the fracturing fluid 112. Multiple components may added at a respective addition point. Examples of components added to the fracturing fluid 112 via one or more of the addition points 118, 120, and 122 may include brine, brine substitute, surfactant, gas, N2 gas, CO2, water, oil (e.g., mineral oil), microparticles, nanoparticles, crosslinker (e.g., giving metal ions), breaker, biocide, and so on. Brine or brine substitute may typically be added to the source 110 vessel for batch mixing. Brine substitute is typically liquid-organic clay stabilizer for temporary or permanent clay stabilization. The brine substitute in VES fluid may have dual role in clay sensitive formation including clay control and rheology control for the VES fluid. These clay inhibitors in the brine substitute are utilized in place of KCl or other salts of typical brine. Some examples of the clay inhibitors include choline chloride, tetramethyl ammonium chloride, 1,6-hexametthylenediamine hydrochloride, and the like. Examples of surfactant include VES, foaming surfactant (foamer), or emulsifying surfactant (emulsifier). If CO2 is added, the CO2 may be added in supercritical condition. For CO2 or N2, the rig up may be separated from the other liquid phase. CO2 or N2 may be mixed with the liquid stream, for example, at the wellhead. Examples of the fracturing fluid 110 include liquid part foam fracturing fluid, VES-based fracturing fluid, emulsion fracturing fluid, or oil-based fracturing fluid, and so on.

The first addition point 118 is to the source 110 vessel holding the fracturing fluid 112. Components added to the fracturing fluid 112 at source 110 may be batch mixed with the fracturing fluid 112 in the vessel in some implementations. As mentioned, brine is an example of a component that may typically be added to the source 110 vessel. The second addition point 120 is to fracturing fluid 112 flowing through the suction conduit of the pump 114. Proppant is an example of a component that may typically be added to the suction conduit of the pump 114. The third addition point 122 is to fracturing fluid 112 flowing through the discharge conduit of the pump 114. An example of a component that may be injected to the discharge conduit of the pump 114 is surfactant. Each addition point may include a respective control device 124, 126, and 128 for adjusting the component stream being added to the fracturing fluid 112. The adjustment may be to adjust the addition rate (flow rate) of the component stream and/or component concentration in the component stream. Each addition point may include multiple conduits and control devices for adding multiple components separately.

The hydraulic fracturing system at the well site 100 may have a source of proppant, which can include railcars, hoppers, containers, or bins having the proppant. Proppant may be segregated by type or mesh size (particle size). The proppant can be, for example, sand or ceramic proppants. The proppant may have advanced coatings. The source of proppant may be at the Earth surface 104 near or adjacent to the source of fracturing fluid 110. The proppant may be added to the fracturing fluid 112 such that the fracturing fluid 112 includes the proppant. In some implementations, the proppant may be added (for example, via gravity) to a conduit conveying the fracturing fluid 112, such as at a suction of a fracturing fluid pump 114. As mentioned, the proppant may be added (e.g., via gravity) to the suction conduit of the pump 114 via the control device 126. The control device 126 may include a feeder or blender that receives proppant from the proppant source and discharges the proppant into pump 114 suction conduit conveying the fracturing fluid 112. Different proppant sizes may be utilized during the job to form pillars. The smaller proppants will generally have the lower settling velocity than the larger proppant particles. This can be relied on to make different pillars without changing the rheology of the fracturing fluid in some embodiments. Again, these proppant particles can be coated for agglomeration. The coating can be resin or tackifying material, and the like.

The fracturing fluid 112 may be a slurry having the solid proppant. The pump 114 discharge flow rates (frac rates) may include a slurry rate which may be a flow rate of the fracturing fluid 112 as slurry having proppant. The pump 114 discharge flow rates (frac rates) may include a clean rate which is a flow rate of fracturing fluid 112 without proppant. In particular implementations, the fracturing system parameters adjusted may include at least pump(s) 114 rate, proppant concentration in the fracturing fluid 112, component addition rate (e.g., at addition points 118, 120, and 122), and component concentration in the fracturing fluid 112. Fracturing operations can be manual or guided with controllers.

The well site 100 may include a control system 116 that supports or is a part of the hydraulic fracturing system. The control system 116 includes a processor 130 and memory 132 storing code 134 (e.g., logic, instructions, etc.) executed by the processor 130 to perform calculations and direct operations at the well site 100. The processor 130 may be one or more processors and each processor may have one or more cores. The hardware processor(s) 130 may include a microprocessor, a central processing unit (CPU), a graphic processing unit (GPU), a controller card, or other circuitry. The memory 132 may include volatile memory, such as cache and random access memory (RAM). The memory 132 may include nonvolatile memory, such as a hard drive, solid-state drive, and read-only memory (ROM). The memory 132 may include firmware. The control system 116 may include a desktop computer, laptop computer, computer server, programmable logic controller (PLC), distributed computing system (DSC), controllers, actuators, control cards, an instrument or analyzer, and a user interface. In operation, the control system 116 may facilitate processes at the well site 100 and including to direct operation of aspects of the hydraulic fracturing system. The control system 116 may be communicatively coupled to a remote computing system that performs calculations and provides direction. The control system 116 may receive user input or remote-computer input that specifies the set points of the control devices 124, 126, and 128 or other control devices in the hydraulic fracturing system.

The control system 116 may specify the set point of the control devices 124, 126, and 128 for component additions to the fracturing fluid at the addition points 118, 120, and 122, respectively. The set points (and associated time intervals for intermittently changing between set points) may be manually input by a user or human operator into the control system 116. In some implementations, the control system 116 may calculate or otherwise determine the set point of the control devices 124, 126, and 128. The determination may be based at least in part on calculations (e.g., mass balance calculations), operating conditions of the hydraulic fracturing, and information (or feedback) from the hydraulic fracturing system. The control system 116 may include local controllers distributed at the well site 100 that perform these functions independent of central control by the control system 116.

Whether based on human input or as determined by the control system 116, the control system 116 may intermittently adjust a characteristic (property, attribute, etc.) of the fracturing fluid 112 conveying the proppant to form pillars of proppant in the fractures. The characteristic adjusted may be tiered in that an overall attribute such as viscosity or proppant suspension is adjusted by adjusting concentration or addition rate of a component of the fracturing fluid 112. The control system 116 intermittently adjusting the characteristic may involve the control system 116 adjusting the characteristic at a frequency of a specified time interval to give pillar formation. The time interval as specified and applied may be, for example, in the range of 1 minute to 2 hours, or in the range of 2 minutes to 100 minutes. Again, the time interval may be specified (input) to the control system 116. The set points for values of (or associated with) the characteristic may be specified (input) to the control system 116 to provide for pillar formation. The control system 116 may include a controller (e.g., control card or other circuitry) to receive the inputs and drive control devices (e.g., 124, 126, and/or 128) to make the intermittent (recurrent, alternating, periodic, cyclical, repeated cycle, etc.) adjustments of the characteristic at the time interval to form the pillars. This controller may be encompassed by the processor 130 and the code 134 as executed by the processor 130. In operation, the control system 116 may alternate between (repeatedly cycle through) a first value of the characteristic and a second value of characteristic that is different than the first value. The control may alternate between more than two values of the characteristic.

In some embodiments, the control system 116 alters viscosity of the fracturing fluid 112 to provide for segregation of proppant in the fractures to form the pillars. In some examples, surfactant (e.g., VES, emulsifying surfactant, foaming surfactant, etc.) increases viscosity of the fracturing fluid conveying the proppant. Thus, the characteristic may be concentration of the surfactant in the fracturing fluid 112 or addition rate of the surfactant to the fracturing fluid 112. A first concentration of surfactant in the fracturing fluid 112 may give a first viscosity value of the fracturing fluid 112, and a second concentration (lower than the first concentration) of surfactant may give a second viscosity value of the fracturing fluid 112 that is less than the first viscosity value. The intermittent adjustments may be to alternate between the first concentration and the second concentration. The intermittent adjustments may be to alternate between a first addition rate of the surfactant that gives the first concentration and a second addition rate of the surfactant less than the first addition rate to give the second concentration. The addition rate of the surfactant may be controlled by a local controller via the respective control device 124, 126, or 128, or controlled by the control system 116 via the respective control device 124, 126, or 128. In some examples, the surfactant may be added on-the-fly at the addition point 122 to the discharge conduit of the pump 114 as the pump 114 is pumping the fracturing fluid 112 with the proppant. The control device 124 (e.g., flow control valve) may adjust the addition rate (e.g., mass flow rate or volume flow rate) of the surfactant to the fracturing fluid 112. The control system 116 controller may adjust the set point of the flow controller (FC) of the flow control valve that is the control device 124. The inputs to the control system 116 may be the first and second concentrations or the first and second addition rates. To form the pillars, the control system 116 may alternate between (repeatedly cycle through) the first concentration or addition rate and the second concentration or addition rate is different than the first concentration or addition rate. A third concentration (or third addition rate), fourth concentration (or fourth addition rate), etc. may be included in the cycle. This example control scheme with respect to surfactant may apply to other components of the fracturing fluid 112, such as microparticles or nanoparticles, oil (e.g., mineral oil), water, crosslinker, brine, brine substitute, and so on.

The brine or brine substitute may be more typically added at addition points 118 or 120. To affect the rheology or viscosity of the fracturing fluid 112 (e.g., to affect proppant suspension capacity) to form pillars, the intermittent adjustments may involve cycling through different values of the salinity of the brine and/or the amount of brine incorporated into the fracturing fluid 112. Adjusting the salinity of the brine (concentration of salt in the brine) are the amount of brine added to the fracturing fluid 112 may give adjusted concentrations of salt in the fracturing fluid 112 to affect the viscosity of the fracturing fluid 112.

For instances of the fracturing fluid 112 as foam fracturing fluid, the characteristic intermittently adjusted may be volume concentration of gas (e.g., N2) or supercritical CO2 in the fracturing fluid 112 or addition rate of gas (e.g., N2) or supercritical CO2 (or water) to the fracturing fluid 112 to give an alternating FQ to drive pillar formation in the fractures. The N2 or CO2 may added to and mixed with the liquid portion of the fracturing fluid 112 at the wellhead. In some implementations, the addition point 122 may be characterized as at the wellhead instead of on the discharge conduit of the pump 114. The addition rate of the N2 gas or supercritical CO2 (or water) may be controlled by a local controller outside of or part of the control system 116 via a control device, such as control device 128. The CO2 or N2 supply have dedicated and separate high pressure pumps, and high pressure treatment lines. Again, the liquid and the gas phases may be mixed at the wellhead. To form the pillars, the control system 116 or local control system may alternate between (repeatedly cycle through) the first FQ or N2/CO2 addition rates and the second FQ or N2/CO2 addition rate that are different than the first FQ or N2/CO2 addition rates.

Furthermore, particles having a nominal diameter less than 1 millimeter (mm) may be added to the fracturing fluid 112 to increase viscosity of the fracturing fluid 112. Therefore, the concentration of these particles in the fracturing fluid 112 or the addition rate of these particles to the fracturing fluid 112 may be a characteristic that is intermittently adjusted. These particles may be microparticles or nanoparticles, or both. The control system 116 may alternate between (repeatedly cycle through) a first concentration of the particles and a second concentration of the particles that is different than the first concentration. In some examples, one of the first or second concentrations may be zero (no microparticles or nanoparticles included or added to the fracturing fluid 112). Moreover, the cycle may include more than two concentrations or two addition rates. Lastly, it should be noted that adding larger particles may not increase viscosity but can increase density of fracturing fluid 112 slurry. Also, with smaller nanoparticles, the viscosity may increase via interaction of the nanoparticles with surfactant, VES, or polymer in the fracturing fluid. In embodiments, the addition of nanoparticles without the presence of surfactant or polymer may not increase viscosity. However, high concentration of smaller particles (nanoparticles) in fracturing fluid 112 fluid without surfactant or polymer may increase viscosity of the fracturing fluid 112 is some implementations.

For embodiments with the fracturing fluid 112 as an emulsion fracturing fluid that includes an emulsion of viscosified water and oil, the ratio of oil to water may affect viscosity or proppant suspension of the fracturing fluid 112. Therefore, this ratio may be a characteristic of the fracturing fluid 112 that is intermittently adjusted to provide for forming pillars of proppant in the fractures. In one example, altering the addition rate of oil or water added to the fracturing fluid 112 may be implemented to intermittently adjust the oil-to-water ratio. The control system 116 may alternate between (repeatedly cycle through) a first addition rate of oil or water and a second addition rate of oil or water that is different than the first addition rate. The cycle may include further addition rates of oil or water that are different than the first and second addition rates.

Figure 2:
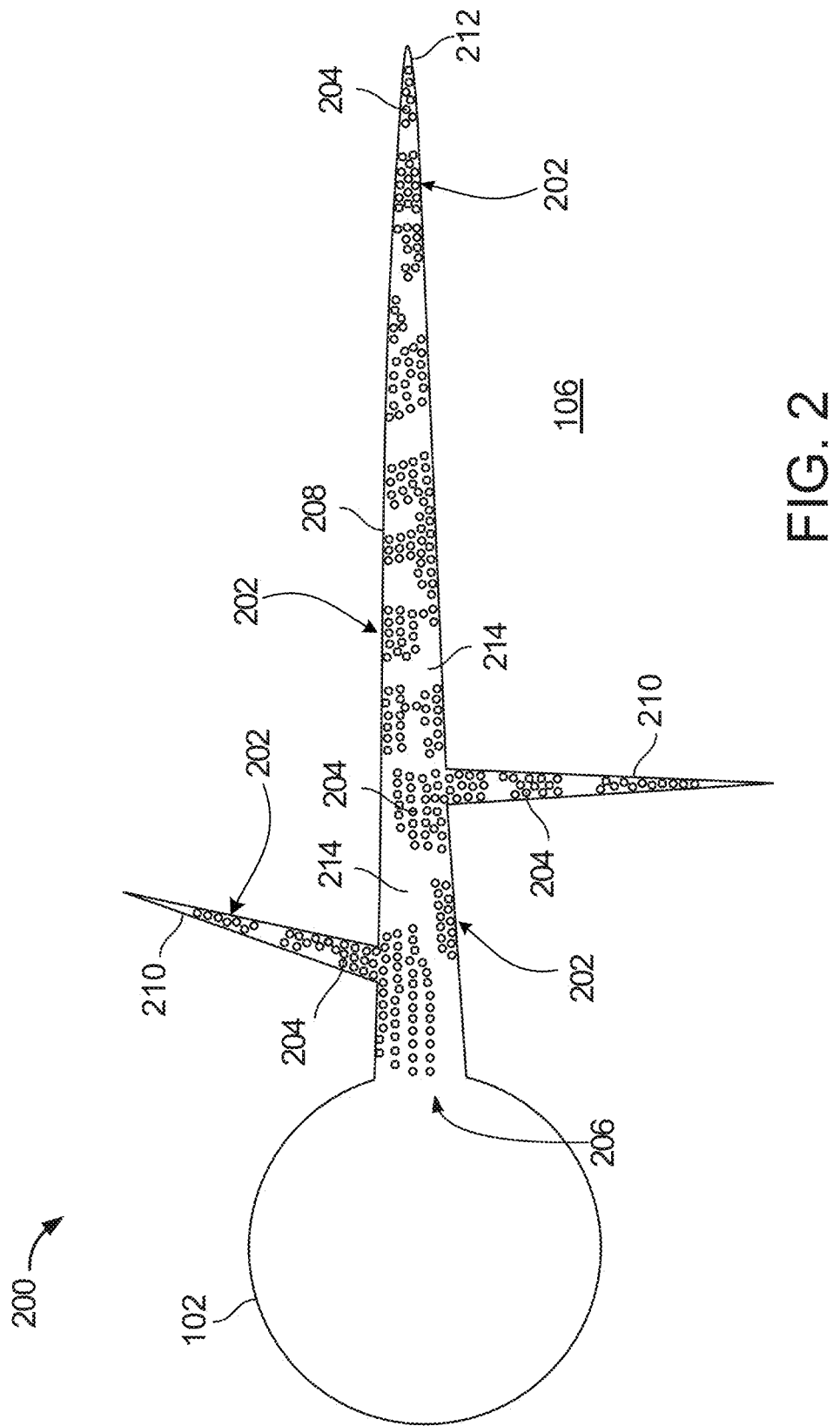
FIG. 2 is a diagram of hydraulic fractures having pillars of proppant disposed in the fractures 200.

FIG. 2 are hydraulic fractures 200 having pillars 202 of proppant 204 disposed in the fractures 200. The hydraulic fractures 200 are associated with the wellbore 102 of FIG. 1. The wellbore 102 is depicted as a circular cross-section in FIG. 2. In preparation for the hydraulic fracturing, a perforation 206 may be formed through the wellbore 102 wall into the subterranean formation 106. The wellbore 102 may be a cemented cased wellbore. The perforation 206 may be formed to allow for flow of fracturing fluid 112 (with and without proppant 204) from the wellbore 102 into the formation 106.

In the illustrated implementation, the depicted hydraulic fractures 200 include a main or primary fracture 208 and secondary fractures 210. The fractures 208, 210 are hydraulically formed by injecting fracturing fluid 112 through the perforation 206 into the subterranean formation 106. Of course, many more secondary fractures 210 than depicted may be formed with complex fracturing via the fracturing fluid 112. The secondary fractures 210 typically have a smaller fracture width than the primary fracture 208. In this embodiment, the fracturing fluid 112 conveys the proppant 204 into the primary fracture 208. The proppant 204 may approach the fracture tip 212 of the primary fracture 208. The distance that the proppant 204 reaches toward the fracture tip 212 may depend on characteristics of the fracturing fluid 112 and the particle size of the proppant 204. The proppant 204 may be positioned in the primary fracture 208 to maintain open the primary fracture 208. The fracturing fluid 112 may convey the proppant 204 into secondary fractures 210, as depicted, depending on particle size of the proppant 204 and the fracture width of the secondary fractures 210. The proppant 204 if present in a secondary fracture 210 may maintain open the secondary fracture 210. The proppant 204 may include core proppant having a ceramic coating or resin coating, or both. The ceramic coating can include a CMC. The core proppant may be sand, metal, ceramic, organic particles, or other particles.

As mentioned, pillars 202 of proppant 204 may be formed in the fractures 208, 210. The pillars 202 may be accumulations of proppant 204 that are adjacent to regions 214 (e.g., channels) in the fractures 208, 210 with little or no proppant 204. The pillars 202 of proppant 204 may be formed in the fractures 208, 210 by intermittently adjusting a characteristic (e.g., viscosity) of the fracturing fluid 112 conveying the proppant 204 to affect proppant suspension of the fracturing fluid. When the fracturing fluid 112 has a lower viscosity or less proppant suspension capacity, the proppant 204 may settle from the fracturing fluid 112 in the fractures 208, 210 at near wellbore. When the fracturing fluid 112 has a higher viscosity or greater proppant suspension, the fracturing fluid 212 may carry the proppant 204 further into the fractures 208, 210 to deposit the proppant 204. Thus, with varying the viscosity or related characteristic (or other characteristic) of the fracturing fluid 112, the distribution of the proppant 204 in the fractures 208, 210 may give the accumulations or pillars 202 of the proppant 204. This segregating or altering of the proppant distribution (final distribution) in the fractures 208, 210 can increase length and conductivity of the fractures 208, 210. Moreover, the segregation can be promoted by redistribution involving pickup, re-suspend, transport, and resettle. The segregated distribution forming the pillars 202 may be advanced with the intermittent adjustments to the fracturing fluid implemented as a sequential or repeated cycling of values for the characteristic or for operating parameters (e.g., component concentrations or addition rates) associated with the characteristic or attribute.

Figure 3:
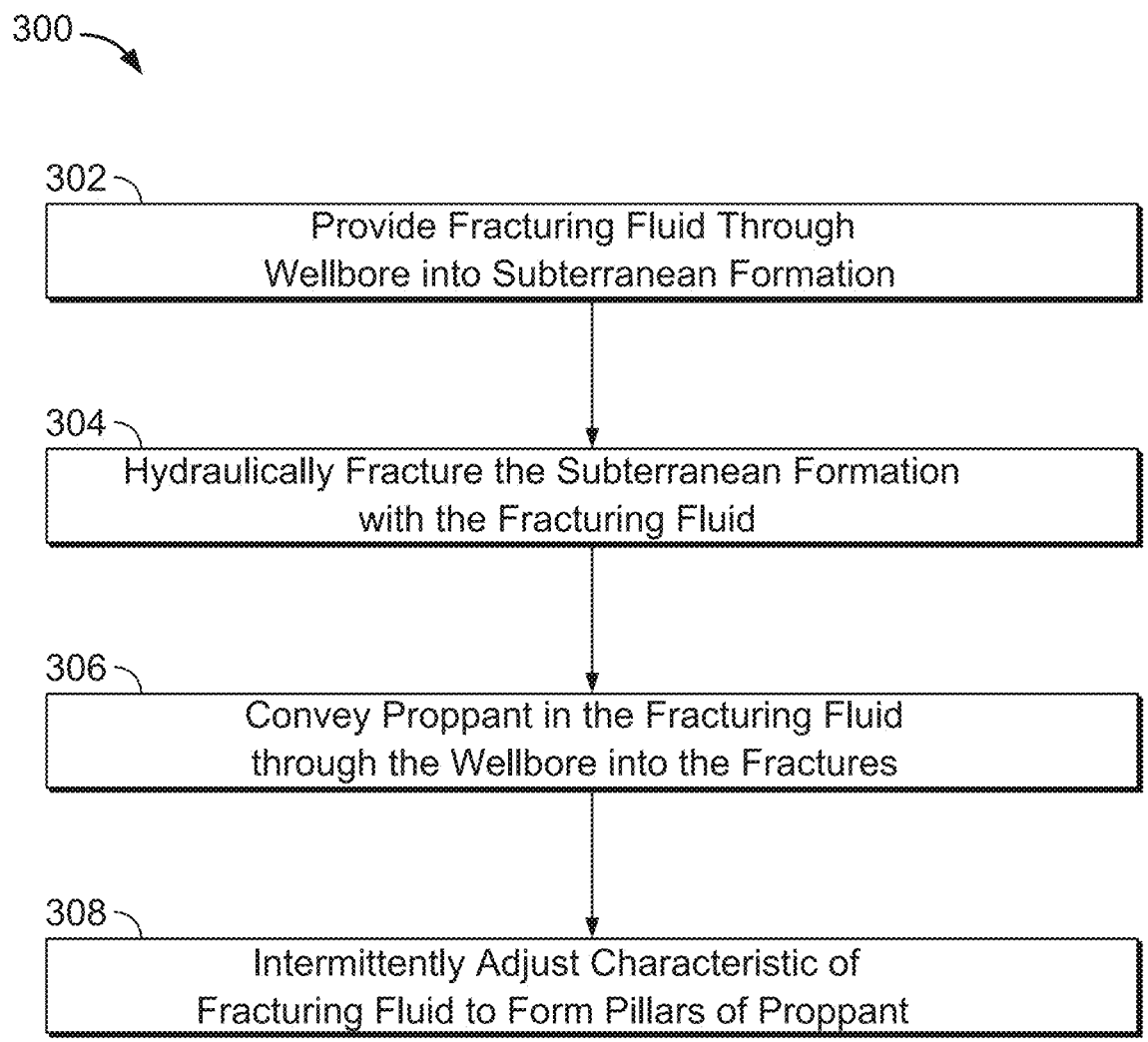
FIG. 3 is a block flow diagram of a method of hydraulic fracturing a subterranean formation, including to form pillars (accumulations) of proppant in the generated fractures.

FIG. 3 is a method 300 of hydraulic fracturing a subterranean formation in the Earth crust, including to form pillars (accumulations) of proppant in the generated fractures. The subterranean formation may also be labeled as a geological formation, reservoir formation, reservoir, rock formation, hydrocarbon formation, and the like. A hydraulic fracturing system may be disposed at the Earth surface near or adjacent a wellbore in the subterranean formation. The hydraulic fracturing system may include a source, e.g., including vessel(s), of fracturing fluid. The hydraulic fracturing system may also include a source of proppant. In implementations, the proppant can be advanced proppant, for example, in having advanced coatings.

At block 302, the method includes providing (e.g., pumping) the fracturing fluid through the wellbore into the subterranean formation. The fracturing fluid may be pumped from the Earth surface. Proppant may be added to the fracturing fluid at the Earth surface. The wellbore may be a cased wellbore having perforations for flow of the fracturing fluid (with and without proppant) into the subterranean formation. The fracturing fluid may be, for example, foam fracturing fluid, VES-based fracturing fluid, emulsion fracturing fluid, oil-based fracturing fluid, and other types of fracturing fluid. For a given hydraulic-fracturing job, a single type of fracturing fluid may be utilized to form the pillars of proppant in fractures. In other words, alternating or pulsing different types of fracturing fluid is not required to form the pillars.

At block 304, the method includes hydraulically fracturing the subterranean formation with the fracturing fluid, thereby generating fractures in the subterranean formation. In particular, the injection of the fracturing fluid by the pump through the wellbore perforations into the subterranean formation may hydraulically fracture the subterranean formation. The fracturing fluid may include additives, such as a viscosifier, friction reducer, clay inhibitor, buffer, scale inhibitor, flowback enhancer, corrosion inhibitor, or fluid loss agent, or any combinations of these. The fluid may include suspending agent such as fibers of degradable materials, degradable materials, and tackifying agents. The fracturing fluid may have a friction reducer to decrease friction experienced by the fracturing fluid in the pumping of the fracturing fluid through the wellbore into the subterranean formation. The friction reducer may be, for example, an anionic copolymer. The viscosifier (for example, a polysaccharide) increases viscosity of the fracturing fluid. One example of polysaccharide as a viscosifier is guar or guar gum (also called guaran), which is a galactomannan polysaccharide. For multi-phase fracturing fluid, the viscosifier and friction reducer may generally reside in the aqueous phase in implementations.

At block 306, the method includes conveying proppant in the fracturing fluid through the wellbore into the fractures. In implementations, the fracturing fluid with the proppant may hydraulically fracture the subterranean formation and increase width of hydraulic fractures already generated by the fracture fluid without proppant. The portion of the hydraulic-fracturing job in which the fracturing fluid has proppant may transport the proppant into the hydraulic fractures via the fracturing fluid. The fracturing fluid, as pumped and injected, may distribute the proppant in the fractures.

At block 308, the method includes intermittently adjusting a characteristic (e.g., attribute, property, component concentration, etc.) of the fracturing fluid conveying the proppant to form pillars of proppant in the fractures. Thus, the method may include forming pillars of proppant in the fractures by intermittently adjusting a property of the fracturing fluid conveying the proppant. In implementations, the action of intermittently adjusting the characteristic does not include changing type of fracturing fluid or pulsing different types of fracturing fluid. In implementations, intermittently adjusting the characteristic or property includes adjusting the characteristic or property at a frequency at an interval in a range of 1 minutes to 2 hours, or 2 minutes to 100 minutes. The characteristic may be proppant suspension or the property viscosity, or both. The characteristic may be surfactant concentration (in the fracturing fluid) or brine concentration (salt concentration in the brine incorporated into the fracturing fluid), or both. The characteristic may be concentration of microparticles or concentration of nanoparticles, or both, in the fracturing fluid. In implementations, intermittently adjusting the characteristic of the fracturing fluid does not include pulsing proppant in the fracturing fluid. Further, again, without changing the rheology of fluid but altering size of proppant injected can give different settling rates giving pillar formation. The particle diameter or mesh size of the proppant may be alternated between different values in the intermittent adjusting or cycling, with or without adjusting rheology of the fracturing fluid, to form pillars in certain implementations.

For the fracturing fluid including foam, the characteristic of the fracturing fluid adjusted may be associated with the foam. The fracturing fluid may be foam fracturing fluid and the characteristic is a characteristic of the foam fracturing fluid. The characteristic or property may be at least one of foam stability or concentration of a foaming surfactant in the fracturing fluid. The action of intermittently adjusting the concentration of the foaming surfactant may involve repeatedly cycling through a first concentration of the foaming surfactant in the foam fracturing fluid and a second concentration of the foaming surfactant in the foam fracturing fluid different than the first concentration. Additional concentrations (e.g., third, fourth, etc.) different than the first and second concentrations may be incorporated into the adjustment cycle. The characteristic or property may be FQ that can be, for example, in the range of 52% to 80% by volume. The action of intermittently adjusting the FQ may involve repeatedly cycling through a first FQ of the foam fracturing fluid and a second FQ of the foam fracturing fluid different than the first FQ. Additional FQ values (e.g., third, fourth, etc.) different than the first FQ and second FQ may be incorporated into the adjustment cycle.

As discussed and with respect to the method 300, the fracturing fluid may be a non-foam fracturing fluid. For example, the fracturing fluid may be VES-based fracturing fluid, and wherein the characteristic is concentration of VES in the VES-based fracturing fluid. As described, the action of intermittently adjusting the concentration of the VES in the VES-based fracturing fluid may involve repeatedly cycling through a first concentration of the VES in the VES-based fracturing fluid and a second concentration of the VES in the VES-based fracturing fluid different than the first concentration. Additional values (e.g., third, fourth, etc.) for the concentration of the VES in the fracturing fluid different than the first concentration and the second concentration may be incorporated into the adjustment cycle. As also discussed, another characteristic of VES-based fracturing fluid (or other fracturing fluids) that may be intermittently adjusted to form pillars of proppant in the fractures may include concentration of microparticles or concentration of nanoparticles, or both, in the VES-based fracturing fluid.

As indicated for the fracturing fluid as foam fracturing fluid, the continuous phase may be water (aqueous phase). The discontinuous gas phase dispersed in the water may be an inert gas, nonpolar gas, inert nonpolar gas, gas generally immiscible with water, CO2, N2, ethane, propane, butane, or argon, or mixtures of these. The fracturing fluid as an emulsion fracturing fluid (mixture of two immiscible liquids) may include an emulsified mixture of water (e.g., viscosified water) and oil (e.g., mineral oil). In the emulsion fracturing fluid, the water (aqueous phase) in the emulsion may be the continuous phase and the oil the discontinuous phase, or the oil may be the continuous phase and the water is the discontinuous phase. The surfactant may be an interfacial surfactant. The surfactant, such as the emulsifying surfactant or the foaming surfactant, may absorb to the boundary between two immiscible phases and facilitate formation of the emulsion or the foam. Surfactant molecules may be amphiphilic in having a hydrophobic part (hydrophobic tail) and a hydrophilic part (polar head group). The surfactant may absorb to the interface between a hydrophobic phase (for example, oil or nonpolar gas) and a hydrophilic phase (for example, water). At the interface, the surfactant aligns so that the hydrophobic tail of the surfactant molecule is in the nonpolar gas or oil, and the polar head group of the surfactant molecule is in the water. This may cause a decrease in surface or interfacial tensions. The hydrocarbon tail may be, for example, a hydrocarbon, fluorocarbon, or siloxane. Surfactants may be classified as nonionic, anionic, cationic, or zwitterionic based on the charge of the polar head group. A nonionic surfactant has a polar head group with no charge. Examples of nonionic surfactant include alcohol ethoxylates (AE) including ethoxylated aliphatic alcohols. An anionic surfactant has a polar head group with a negative charge. Examples of anionic surfactant are alkyl sulfates. A cationic surfactant has a polar head group with a positive charge. Examples of cationic surfactant are quaternary ammonium salts. A zwitterionic surfactant has a polar head group with both a positive charge and a negative charge. Examples of zwitterionic surfactant include betaines and amphoacetates. The surfactant as interfacial surfactant in the fracturing fluid that may facilitate formation of the foam fracturing fluid or the emulsion fracturing fluid with the water as the continuous phase may be a cationic compound, an anionic compound, a nonionic compound, or a zwitterionic compound. For instance, the surfactant may be betaines, sulfated or sulfonated alkoxylates, alkyl quarternary amines, alkoxylated linear alcohols, alkyl sulfonates, alkyl aryl sulfonates, or C10-C20 alkyldiphenyl ether sulfonates. The surfactant may be polyethylene glycols, ethers of alkylated phenol, sodium dodecylsulfate, alpha olefin sulfonates (for example, sodium dodecane sulfonate), and trimethyl hexadecyl ammonium bromide.

For embodiments of the VES-based fracturing fluid, a purpose of the VES (for example, cationic, anionic, nonionic, zwitterionic or amphoteric, or a combination of cationic and anionic surfactants) is to form micelles to increase viscosity of the fluid to give the VES-based fluid. Cylindrical (truncated) or wormlike micelles give greater fluid viscosity than spherical micelles. Spherical micelles generally do not produce viscosity. Truncated cylindrical micelles may make worm-like or rod-like micelles that entangle to give viscosity. VES-based systems may include a surfactant (VES) capable of forming a wormlike micelle that can entangle and thus impart viscosity to the fluid. The fluid system typically includes salt to drive formation of the micelles, such as worm-like micelles that entangle. VES-based fluids may also contain a breaker to disrupt the micelles and reduce the viscosity while in the formation to enhance flowback.

Surfactant (VES) selection may be an aspect of formulating a VES-based fracturing fluid. Under certain conditions, surfactant molecules arrange into colloidal structures called micelles as indicated earlier. With these structures, the hydrocarbon tails of the surfactants orient toward each other while the polar head groups form an interface with the surrounding aqueous media. In addition to surfactant selection, formulation of the present VES-based fracturing fluid may further include salt selection. The salts utilized may interact electrostatically with the polar head groups and thereby reduce head group repulsion. This may cause a structural change to the micelle to ideally form wormlike micelles that can entangle with one another and cause the viscosity of the VES-based fracturing fluid to increase. A wide range of salts are capable of interacting in this manner. These salts can include monovalent or divalent salts.

Embodiments of the present VES-based fluid for hydraulic fracturing include water and surfactant (VES) to form the VES-based fluid. The majority (>90 volume %) of the fluid is water. The amount of VES used for the fluid can range 4-8 volume % depending on the temperature and viscosity requirement. The VES concentration may fall below this range (and even approach zero) in the portion of the sequence or cycle of the intermittent adjustments when low viscosity in required. Again, the salt (e.g., from the brine) may promote micelle formation for increased viscosity of the VES fluid. The salt may be a monovalent salt or divalent salt, or other salt. The salt concentration in the fracturing fluid may approach zero in the portion of the sequence or cycle of the intermittent adjustments when low viscosity in required. Other fluid additives in the VES-based fluid may include a breaker, stabilizer, microparticles, nanoparticles, crosslinker, corrosion inhibitor, scale inhibitor, biocide, or pH buffer, or any combinations of these. In some cases, crude oil produced from formation may act as a viscosity breaker for the VES fluid.

The VES-based hydraulic fracturing fluid may have a concentration of the VES, for example, in a range of 0.1 weight percent (wt %) to 10 wt %, in a range of 0.5 wt % to 7 wt %, or at least 1 wt %. The VES-based hydraulic fracturing fluid may have a concentration of the VES, for example, in a range of 2 vol % to 8 vol %. The VES may be, for example, a zwitterionic or amphoteric surfactant, a cationic surfactant, an anionic surfactant, a nonionic surfactant, or a combination of cationic and anionic surfactants. The zwitterionic surfactant may be a betaine, phosphobetaine, or sultaines. The cationic surfactant may include, for example alkylammonium salts. Anionic surfactants as the VES for the VES-based hydraulic fracturing fluid may include alkyl sarcosinates or sulfonates. Nonionic surfactants as the VES for the VES-based hydraulic fracturing fluid may include amine oxides. The VES-based hydraulic fracturing fluid may include monovalent or divalent salts at a concentration, for example, in ranges of 0.1 wt % to 20 wt %, 1 wt % to 20 wt %, 0.1 wt % to 15 wt %, 1 wt % to 15 wt %, or less than 15 wt %. The salt concentration may be, for example, least 1 wt %, at least 3 wt %, at least 5 wt %, at least 7 wt %, at least 10 wt %, or at least 12 wt %. These salts may promote micelle formation, such as wormlike or cylindrical micelles, to increase viscosity of the fracturing fluid. These monovalent or divalent salts may include, for example, ammonium chloride ($NH_4Cl$), sodium chloride (NaCl), potassium chloride (KCl), calcium chloride ($CaCl_2$)), strontium chloride ($SrCl_2$), sodium bromide (NaBr), and calcium bromide ($CaBr_2$).

VES-based fluids generally differ from conventional polymer-based fracturing fluid systems. Polymer-based fracturing fluids typically incorporate a water-soluble polymer, clay control, surfactant, biocides, pH control, gel stabilizer, crosslinker, and breaker. A viscous polymer-based fluid (for example, a gel at greater than 10 centipoise [cP]) is pumped into a geological formation and with the gel fluid transporting proppant into a fracture network. Then, the gel is broken by enzyme or oxidizer and the fluid flowed back from the formation to the surface. This process may be operationally complex in relying on polymer hydration and a variety of additives, such as biocides, crosslinkers, and breakers. By contrast, VES may be simpler to utilize in the field because typically there is no hydration step and because fewer additives may be included. For example, in the case of breakers, VES-based fluids can break in the formation by changes in brine concentration due to contact with produced fluids or alternatively by contact with hydrocarbons which disrupt the surfactant micelles of the VES-based fluid. Further, an advantage of VES-based fluids over polymer-based systems can be that VES-based fluids may typically be solids-free (except for any proppant). Therefore, in implementations, the VES-based fluids generally do not deposit residue in the geological formation or on the proppant pack. Thus, VES-based fluids may be more efficient than polymer-based systems in hydraulic-fracture reservoir stimulation because the conductivity of the in-place proppant pack affects well productivity. In addition, VES-based fluids may heal after exposure to shear. Additives may further improve the shear re-healing time of the VES-based fluid gel. A benefit of healing may be that viscosity is maintained for conveying proppant. The self-healing may restore the micelles and hence the viscosity. The VES fluid experiences shear forces during pumping at the wellhead. The viscosity may be restored as the VES fluid goes into the wellbore and formation and thus perform hydraulic fracturing and convey proppant. Crosslinked polymer fluids, by contrast, can be irreversibly damaged during pumping because the shear forces cause some of the covalent bonds to break. The micelles of the VES fluid are not covalently held together and their formation is reversible. This may be an advantage of VES over crosslinked polymer for hydraulic fracturing. Embodiments employ VES gels to hydraulically fracture unconventional and conventional source-rock formations.

With respect to the proppant, the proppant may be coated proppant. The underlying proppant particle that receives the coating (e.g., resin, ceramic, etc.) may include particles of materials such as inorganic oxides, silicates, sand, graded sand, treated sand, ceramic, plastic, alumina, bauxite, silica, ceramic, thermoset resins, resin, epoxy, plastic, mineral, glass, silicon carbide, silicon nitride, zirconia, walnut hulls, composites of resin and other minerals or combinations of these. Proppant coatings protect the proppant particle from degradation caused aqueous fluids at downhole temperatures. The proppant coating increases surface area of the particle and therefore crush stress is distributed over a greater area of the coated proppant particle. In turn, the distribution of force along a greater area should result in decrease in amount of crushed proppant particles, also known as the crush percentage. The proppant coating also adheres to the proppant and may prevent proppant that is crushed from releasing proppant fines. Proppant fines may migrate into the formation and restrict flow conductivity of the formation. Conventional uncoated proppant may break under downhole stress. Ceramic proppants not coated may break down in wet conditions, which cause them to lose their crush resistance. Temperatures downhole exacerbate this effect. Sand particles as proppant without coating may not provide sufficient crush resistance for use in a given subsurface formation due to the polycrystalline nature of the grains.

Resin coating as proppant coating may prevent or reduce crushing, fines migration, proppant flowback, and breakdown of the proppant particle. The polymer or resin may include thermoset resin, polyester, urea aldehyde, polyurethane, vinyl esters, or furfural alcohol, or any combinations of these. Resin may be a substance of plant or synthetic origin that is typically convertible into polymers. The resin may be a mixture of organic compounds. In implementations, the viscosity of the resin may be greater than 20 cP measured at a temperature of 120° C. The resin may include phenolic resin, epoxy resin, furan resin, polyurethane resin, polyurea resin, polyester, polyamide-imide resin, polyamide resin polyurea/polyurethane resin, urea-formaldehyde resin, melamine resin, silicone resin, vinyl ester resin, or combinations of these. The resin may be novolacs that are phenol-formaldehyde resins with a formaldehyde to phenol molar ratio of less than 1 and where the phenol units are mainly linked by methylene or ether groups, or both. Novolacs are stable meaning that novolacs generally do not react and do retain their polymer properties at temperatures of less than 300° F., 400° F., 450° F., 500° F., 550° F., or 600° F. The novolac polymer may have a glass transition temperature, for example, greater than 250° F., 300° F., 350° F., 390° F., 400° F., 450° F., or 500° F. Resoles are phenol-formaldehyde resins with a formaldehyde to phenol molar ratio of more than 1 and where the phenol units are mainly linked by methylene or ether groups, or both. The resoles formulation can harden without the addition of a crosslinking agent due to abundance of methylene to bridge the phenol groups. Both the novolac polymer and resoles may each have a molecular weight, for example, in ranges of 1,000 to 100,000 grams per mole (g/mol), 15,000 to 75,000 g/mol, or 10,000 to 50,000 g/mol.

The dispersion of strengthening agents (e.g., nanoreinforcing agents) in the resin coating (or in ceramic coating) increases mechanical strength of the coating materials. The dispersion of strengthening agent may further provide resistance to chemicals present in hydraulic fracturing fluid. The resin coating may be resin nanocomposite coating including a nanoreinforcing agent, a surface modifier, and resin, and which may be uniformly distributed throughout the resin nanocomposite coating.

The surface modifier imparts gas wetting characteristics to the resin nanocomposite coating (and to ceramic coating as well). This reduces the interfacial tension and may prevent condensate or water blockage in the wellbore, increasing gas relative permeability and thereby reducing condensate banking. The surface modifier may also impart hydrophobic or oleophobic characteristics to the proppant, such that water will not wet the surface, which decreases degradation of the proppants caused by contact with water. These wettability characteristics may increase the load recovery of hydraulic fracturing fluid or water after fracturing operation as the hydrocarbons may generally experience less friction from contact with the proppant. This may increase the rate of hydrocarbon production and the overall amount of hydrocarbon produced.

The nanoreinforcing agent as incorporated in the resin coating or ceramic coating may include or be ceramic, metallic, organic, inorganic, or mineral-based. Ceramic materials include, for example, alumina, zirconia, stabilized zirconia, mullite, zirconia toughened alumina, spinel, aluminosilicates (such as mullite or cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, or any combination of these. Metallic materials include, for example, iron, nickel, chromium, silicon, aluminum, copper, cobalt, beryllium, tungsten, molybdenum, titanium, magnesium, silver, as well as alloys of metals, and the like, or any combination of these. Metallic materials may also include the family of intermetallic materials, such as iron aluminides, nickel alum inides, and titanium alum inides. Organic materials include, for example, carbon-based structures such as carbon nanotubes, single walled carbon nanotubes (SWNT), double walled nanotubes (DWNT), multi-walled carbon nanotubes (MWNT), armchair nanotubes, zig-zag nanotubes, helical nanotubes, bundles of single wall nanotubes, bundles of multi-wall nanotubes, nanofibers, nanorods, nanowires, nanospheres, microspheres, whiskers of oxide, fullerenes, graphene, carbon fibers, graphite fibers, nomex fibers, or combinations of these. Inorganic materials include, for example, vanadium pentoxide nanotubes, boron-nitride nanotube, tungsten, disulfidezinc oxide, diamond, clay, boron, boron nitride, silver, titanium dioxide, carbon, molybdenum disulfide, γ-aluminium oxide, titanium, palladium, tungsten disulfide, silicon dioxide, graphite, zirconium(IV) oxide-yttria stabilized, carbon, gd-doped-cerium (IV) oxide, nickel cobalt oxide, nickel(II) oxide, rhodium, sm-doped-cerium(IV) oxide, barium strontium titanate and silver. Mineral-based particulates include, for example, materials as kyanite, mica, quartz, sapphire, corundum, aluminosilicate minerals, and combinations of these. In certain implementations, the nano-reinforcing agent may be at least one of nano-silica, nano-alumina, nano-zinc oxide, carbon nanotubes, nano-calcium carbonate, mica, vanadium pentoxide, boron nitride nanotubes, or nano-zirconium oxide.

Reinforcing the ceramic matrix by mixing in two nanoreinforcing agents may increase the proppant crush resistance performance. The two nanoreinforcing agents may include: (1) the nanoreinforcing agent in the form of tubes, fibers, rope, fibrils, or combinations of these, dispersed in the ceramic coating and bonded to (2) the nanoreinforcing agent in the form of platelets, 2D surface, ribbons, or combinations of these. In some embodiments, the two nanoreinforcing agents may include carbon nanotubes (which have an aspect ratio of greater than 100) and graphene (which provides a 2D planar surface) to give mechanical bridging throughout the proppant coating. This synergistic effect further improves electrical conductivity Reinforcing the resin (polymer) matrix (or reinforcing a ceramic coating matrix) by mixing in two nanoreinforcing agents may increase the proppant crush resistance performance. The two nanoreinforcing agents may include: (1) the nanoreinforcing agent in the form of tubes, fibers, rope, fibrils, or combinations of these, dispersed in the ceramic coating and bonded to (2) the nanoreinforcing agent in the form of platelets, 2-dimensional (2D) surface, ribbons, or combinations of these. In some embodiments, the two nanoreinforcing agents may include carbon nanotubes (which have an aspect ratio of greater than 100) and graphene (which provides a 2D planar surface) to give mechanical bridging throughout the proppant coating. The synergistic effect of combining carbon nanotubes with graphene may further increase electrical conductivity as compared to a proppant coating including carbon nanotubes without graphene. Electrical conductivity can be utilized for mapping the fracture and also determining the stimulated reservoir volume.

In some embodiments, the nanoreinforcing agent may include graphene and carbon nanotubes, which can be a synergistic combination. The graphene may increase strength of the proppant coating, increase conductivity associated with the proppants, etc. The graphene can be, for example, in the form of sheets, platelets, fibers, chemically-modified graphene, doped graphene, graphene nanotubes, functionalized graphene, grossly warped nanographene, or combinations of these. In some implementations, the graphene includes graphene oxide, graphite, etc. Graphene or derivatives of these can be combined with one or more other types of carbon molecules such as diamonds, graphite nanotubes, fullerenes, or combinations of these. The carbon nanotubes include at least one of single-walled nanotubes, double-walled nanotubes, multi-walled carbon nanotubes, or narrow-walled nanotubes. The carbon nanotubes include a diameter of from 1 nm to 200 nm, from 20 nm to 100 nm, from 10 nm to 80 nm, from 4 nm to 20 nm, from 2 nm to 12 nm, or less than 100 nm or less than 80 nm. The carbon nanotubes include a length of from 20 μm to 500 μm or 50 μm to 200 μm, or less than 200 μm or less than 100 μm. The carbon nanotubes include an aspect ratio of from 100 to 100,000, from 100 to 50,000, from 500 to 30,000, or less than 30,000. The term "aspect ratio" refers to a ratio of width to length. The coexistence of nanotubes and graphene fillers shows a distinct synergistic effect in improving the tensile properties. The ability of nanotubes and graphene to synergistically reinforce the polymer matrix is ascribed to the interfacial interaction between filler and matrix and the nanotube-graphene interconnections. Specifically, the molecular couplings between the nanotubes and graphene may transfer load when the proppant coating is under stress. Furthermore, the MWCNTs-GNPs network structures may dissipate mechanical energy throughout the proppant coating. There are synergistic qualities of carbon nanotubes and graphene.

Surface modifiers may be applied to the resin-coated proppant (or to ceramic-coated proppant) to give wetting properties, enhance different component compatibility, or improve the appearance of a coating surface. The surface modifier may be at least one of an alkyl fluorosilane solution, a fluorinated surfactant, a fluorinated polymer, and a fluorinated polymeric surfactant. The alkyl fluorosilane solution, which functions as a surface modifier, may include triethoxy(tridecafluorooctyl) silane. The alkyl fluorosilane solution may include triethoxy(tridecafluorooctyl)silane, for example, in ranges of 1 volume percent (vol %) to 10 vol %, 1 vol % to 8 vol %, 1 vol. % to 6 vol %, or 1 vol. % to 4 vol %, or at least 2 vol %. The surface modifier may include a solvent or alcohol (for example, propanol), for instance, in a range of 90 vol % to 99 vol %. The surface modifier may have the following properties: a pH of less than 7, 6, 5, 4, 3, or 2; a boiling point in a range of 70° C. to 90° C. or 75° C. to 85° C., or at least 75° C. (for example, about 82° C.); a viscosity in a range of 1 millipascal seconds (mPa·s) to 10 mPa·s, 1 mPa·s to 5 mPa·s, 1 mPa·s to 4 mPa·s, 2 mPa·s to 5 mPa·s, or 2 mPa·s to 4 mPa·s (for example, about 2 mPa·s); and a density in a range of 0.5 gram per cubic centimeter ($g/cm^3$) to 1.5 $g/cm^3$ or 0.7 $g/cm^3$ to 1 $g/cm^3$ (for example, about 0.8 $g/cm^3$). In some instances of pillar fracturing, the permeability of particles may not play a significant role in production compared to the regions between the pillars. Yet, the coating may have a dual role of hydrophibizoing the particles, which may bring the particles closer for agglomeration and formation of pillar in the fluid. Once the resin-coated proppant is aggregated in pillar, the resin on particles may promote formation of a stable pillar by providing for binding together of the proppant under formation heat and fracturing pressure.

As mentioned, the proppant may be resin-coated sand (RCS) or resin-coated proppant (RCP). The resin coating may have nanoreinforcement, as discussed. In other words, the resin coating (polymeric coating) may have nanoscale filler material, such as nanoparticles, nanotubes, nanofibers, nanoplatelets, etc. The nanomaterials may be dispersed is solution in organic or inorganic solvents as formed with the resin in resin coating and applied to the sand or proppant to enhance performance. The well-dispersed nanoscale strong fillers (e.g., fibers, tubes, platelets, etc.) with high aspect ratio and surface area may act to bridge the resin matrix against crack and fracture providing additional mechanical strength. An improvement in electrical and thermal conductivity, as well as resistance to chemical degradation at elevated temperature, may be realized. In addition, certain embodiments provide for a synergistic effect of nanotubes and graphene as nanofillers in the resin coating (or in ceramic coating) of the proppant. The reinforcing the resin matrix by mixing in a multi-walled carbon nanotubes (MWNT) dispersion together with graphene further increases proppant crush-resistance performance. The synergistic effect of MWNT (e.g., in basic form of nano-sized ropes) and graphene (e.g. in the form of a two-dimensional [2D] planar surface), adds further enhancement of mechanical bridging across coating matrix and electrical conductivity. The duel improvements may arise from the nanofiller in the form of tubes, fibers, rope or fibrils dispersed in polymer matrix that strengthen the polymers the nanofiller in the form of platelets, 2D surface, ribbons, are further bonded. Proppant resin coatings that contain nanotubes and nanotubes may be toughened with graphene. Features of applicable nanoreinforcement aspects of resin coating, the synergistic effect of nanotubes and graphene on the proppant resin coating, the thermal stability and chemical stability of the resin coating matrix, and effect of nanoreinforcement on long-term conductivity (per American Petroleum Institute [API] long-term conductivity test) including with respect to effect of surface area wettability are presented in US Published Patent Application No. 2019/0345377 A1, which is incorporated by reference herein in its entirety for all purposes. Lastly, the foregoing discussion with respect to nanoreinforcement may be applicable to ceramic coating of ceramic-coated proppant, The proppant may include nano-functionalized coated proppant. During hydraulic fracturing operations, the surface of the proppant particles may interfere with fluid recovery or fluid flow therein due to friction or drag forces, porosity, or hydrophilic property of surface. Additionally deterioration of proppant particulates by diagenesis may reduce production. In response, the nano-functionalized coated proppant may reduce the interfacial tension in the proppant pack in the pillars and prevent or reduce condensate or water blockage in the near wellbore area. The nano-functionalized proppant may have wettability characteristics that are gas wetting and thus increase gas relative permeability, which aid in reducing condensate banking. The nano-functionalized coated proppant may impart hydrophobic and/or oleo-phobic (omniphobic) character to the proppant such that water will generally not wet the surface and thus corrosion of the proppant by water may decrease. The wettability achieved by these proppant may increase load recovery of fracturing fluid or water after the fracturing operation, thereby increasing fracture conductivity and production. Such may also facilitate increase in rate of production of oil and gas from the well at lower draw down pressures. Further, the non-Darcy and multiphase flow effects are better addressed and therefore the retained proppant-pack permeability may be enhanced. Furthermore, preparation of nano-functionalized proppant with low surface energy and desired texture may be implemented without modifying the commercially available coatings. The method functionalizes nanoparticles that can be added to the resin during coating or dusted on the proppant coating during manufacturing to form the functionalized surface. The nanoparticles will have functional group to form the covalent bonding with the resin. Also, relatively small quantity of functionalized nanoparticles may be included the coating. The resin can be reinforced with other material, such as carbon nanotubes, silica, alumina, mica etc., to provide toughness to the coating.

Some embodiments of the present proppant have a proppant coating that is unfunctionalized organic resin with functionalized nanoparticles and a strengthening agent. Thus, the proppant may have nanoparticle coating that is resin coating with nanoparticles. This proppant coating prevents or reduces crushing, fines migration, proppant flowback and breakdown of the proppant particle. The functionalized nanoparticles in the proppant coating impart hydrophobicity, oleophobicity, or omniphobicity to the proppants without the need for an expensive hydrophobic functionalized resin. The functionalized nanoparticles may adhere to the unfunctionalized organic resin. The functionalized nanoparticles provide resistance to the chemicals present in hydraulic fracturing fluid. The dispersion of strengthening agent(s) enhances the mechanical strength of the coating. Unfunctionalized organic resin is a substance of plant or synthetic origin that is typically convertible into polymers, and may be a mixture of organic compounds such as terpenes, an organic compound produced by plants. The viscosity of resin may be greater than 20 cP measured at a temperature of 120° C. In one embodiment, the unfunctionalized organic resin may have no additional additives. The unfunctionalized organic resin may be at least one of phenolic resin, epoxy resin, furan resin, polyurethane resin, polyurea resin, polyester, polyimide-imide resin, polyimide resin polyurea/polyurethane resin, urea-formaldehyde resin, melamine resin, silicone resin or vinyl ester resin, or mixtures thereof. In implements, the unfunctionalized organic resin includes phenol-formaldehyde. The phenolformaldehyde resin may comprise novolac or resole. Novolacs are phenol-formaldehyde resins with a formaldehyde to phenol molar ratio of less than 1, where the phenol units are mainly linked by methylene or ether groups, or both. The strengthening agent may be nanoparticles, nanofibers, micro-fibers, microparticles. The strengthening agent may include carbon nanotubes, silica, alumina, glass, mica, graphite, talc, nanoclay, graphene, carbon nanofibers, boron nitride nanotubes, vanadium pentoxide, zinc oxide, calcium carbonate, zirconium oxide, titanium oxide, silicon nitride, silicon carbide, and aramid fibers. The carbon nanotubes may be single-walled nanotubes, double-walled nanotubes, multi-walled carbon nanotubes, narrowwalled nanotubes, or bundle of nanotubes. Preparation of the resin coating may including to functionalize nanoparticles to give the functionalize nanoparticles. The method may involve reacting nanoparticles with at least one of an alkoxysilane solution or a halosilane solution to form functionalized nanoparticles, in which functionalized nanoparticles include nanoparticles having fluorosilane, perfluorosilane or alkylsilane moieties attached to the nanoparticles. The underlying proppant particles may be coated with the unfunctionalized organic resin, strengthening agent, and the functionalized nanoparticles to give the resin coated proppant.

Figure 4A:
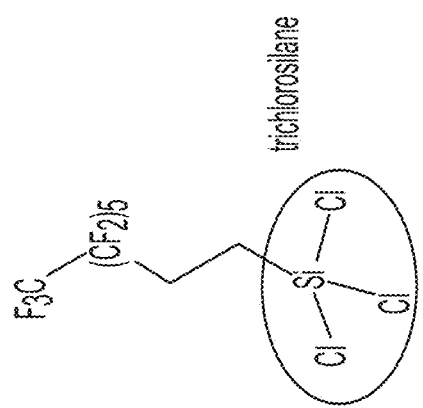
FIG. 4A and FIG. 4B are diagrams depicting a reaction that forms an example functionalized nanoparticle to be included with unfunctionalized organic resin and a strengthening agent in resin coating of proppant.
Figure 4B:
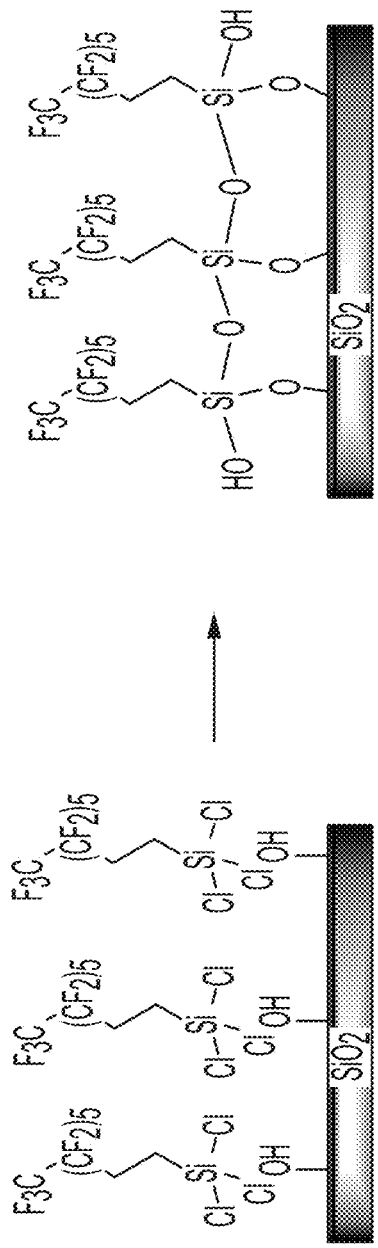

FIG. 4A and FIG. 4B are a reaction forming an example functionalized nanoparticle to be included with the unfunctionalized organic resin and strengthening agent in the resin coating. The functionalized nanoparticles may be formed by reaction with at least one of alkoxysilanes and halosilanes comprising hydrophobic moiety, oleophobic moiety, or omniphobic moiety. The alkoxysilanes bond to the surface silanol groups of silica nanoparticles, forming a 1-3 Si—O—Si link in a condensation reaction with elimination of an alcohol. The halosilanes hydrolyze, substituting the halogen group for an alcohol group, which then undergoes a condensation reaction with surface silanol groups, functionalizing the nanoparticles with low surface energy moiety. This reaction is illustrated in FIGS. 4A and 4B. Although the figures include trichlorosilanes, other halogens may be used in place of the chlorine, such as bromine. Silylethers can also be, for example, perfluorooctyltrimetoxysilane or perfluorooctyltriethoxysilane. Similarly, to make particles hydrophobic, long chain hydrocarbon and silicone derivatization can be done. Such may help in agglomeration of proppant to form pillars in aqueous fracturing fluid.

Figure 5:
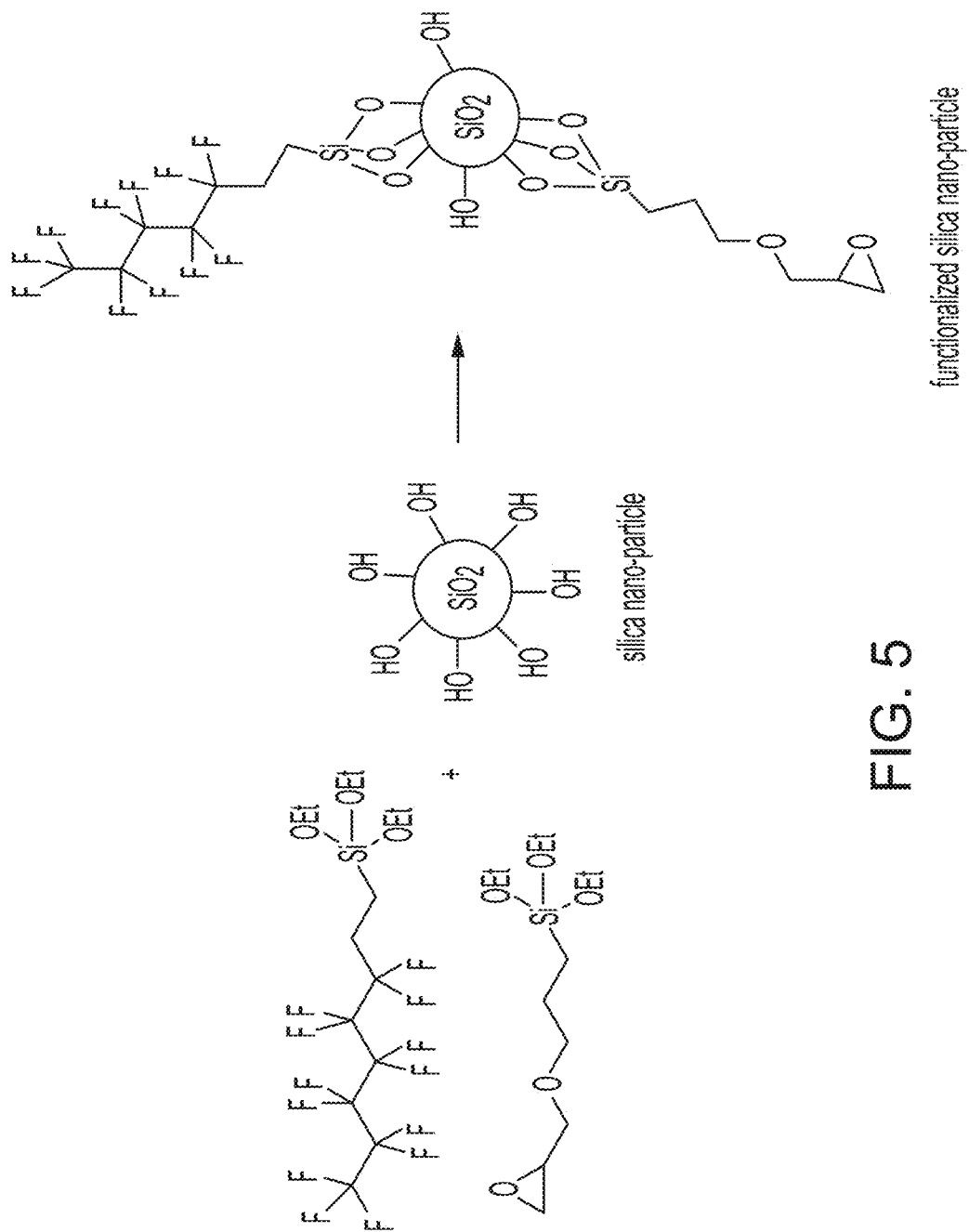
FIG. 5 is a diagram of an example of an epoxy terminal binding group on a functionalized nanoparticle included in resin coating.

FIG. 5 is an example of an epoxy terminal binding group on the functionalized nanoparticle. In some embodiments, the nanoparticles may be further functionalized with a coupling agent. One end of the coupling agent will bind to the nanoparticles while the other end will bind to the unfunctionalized organic resin, thereby bonding the functionalized nanoparticles to the unfunctionalized organic resin. The terminal binding group may include at least one of an epoxy group, an amine group, methyacryloxy group, acrylamide group, aminophenyl group, carboxyl group, halogen group, hydroxyl group, isocynate group, mercapto group, allyl group or a silane ester group that reacts with the nanoparticles and binds with the unfunctionalized organic resin or reacts with the unfunctionalized organic resin to form a bond. In some embodiments, the epoxy containing composition is an epoxysilane with a terminal epoxy group. In some embodiments, the epoxy-containing composition is an alkoxysilane. In some embodiments, the epoxy-containing composition is a silane coupling compound with a terminal reactive group. Examples of silane coupling compound with terminal reactive groups includes but not limited to γ-glycidoxypropyltriethoxysilane, γ-aminopropyltriethoxysilane, γ-(methacryloxy)propyl trimethoxysilane, 3-acrylamidopropyltrimethoxysilane, 4-aminobutryltriethoxysilane, p-aminophenyltrimethoxysilane, carboxyethylsilanetriol sodium, 4-bromobutyltrimethoxysilane, 2-(chloromethyl)allyltrimethoxysilane, hydroxymethyltriethoxysilane, 3-isocyanotopropyltrimethoxysilane, 3-mercaptopropyltrimethoxysilane and allyltrimethoxysilane. The terminal group on nanoparticles are added to react with various unfunctionalized organic resin systems such as phenolic resin, epoxy resin, furan resin, polyurethane resin, polyurea resin, polyester, polyamide-imide resin, polyamide resin polyurea/polyurethane resin, ureaformaldehyde resin, melamine resin, silicone resin and vinyl ester resin.

Ceramic-coated proppant can be used for pillar formation. The ceramic coated proppant can be further coated with resin to form stronger pillars by agglomeration. Ceramic-coated proppant can be mixed with lighter proppants to form pillars by settling velocity difference.

The proppant utilized to form the pillars of proppant may include ceramic-coated proppant. The ceramic coating on the proppant may include a ceramic matrix composite (CMC). The ceramic-coated proppant may be ceramic-coated sand. To form the ceramic-coated proppant for use in the pillar fracturing, particles (e.g., sand particles or other particles) are coated with ceramic and the ceramic coating sintered to strengthen the underlying particle as a proppant. Examples of the ceramic include bauxite, kaolin, and alumina. In certain embodiments, ceramic fibers may be incorporated into the ceramic coating to give ceramic matrix composite (CMC) coating that increases the crack resistance or fracture toughness of the ceramic-coated proppant. In general, a ceramic material is an inorganic non-metallic material and may include, for example, crystalline oxide, alumina, nitride, or carbide material. Some elements, such as carbon or silicon, may be considered ceramics. The underlying proppant (underlying core particles) coated with the ceramic may be inorganic or organic. The inorganic particles include, for example, sand, ceramic, or metal. The organic particles include, for example, walnut hull, thermoplastic resin, polymer derived resin (PDR), or thermoset resin (for instance, epoxy or phenolic). Ceramic proppants can be coated with ceramic coating to improve the performance and properties of the already existing ceramic proppants. For instance, a ceramic proppant may have inadequate strength or inadequate chemical resistance to corrosion. The ceramic coatings of the present techniques may increase strength and chemical resistance of the underlying ceramic proppant. In some cases, a plastic proppant is coated with ceramic to give proppant of adequate strength with reduced density. Inorganic proppant, such as sand, alumina-based proppant, silicate-based proppant, or metal-oxide proppant may be coated with ceramic. Organic proppant, such as walnut hull or thermoset resin, may be coated with ceramic. The success of the hydraulic-fracturing stimulation may partially depend on the strength of the proppant to withstand formation closure stresses. As discussed, crushing of proppant under formation closure stresses generates fines which can cause plugging reducing conductivity and thus reducing flow of produced hydrocarbon. Proppant with increased strength via the ceramic coating is generally more resistant to crushing and associated fines generation that reduce conductivity. Further, proppant made stronger via the ceramic coating can typically better hold the fracture open and maintain the conductivity of the fracture for hydrocarbon to flow.

Sand and ceramic proppant may be coated with resins. Examples of resins include furan resin, epoxy resin, polyurethane resin, phenolic resin, polyester resin, polyurea resin, and polyimide resin. The proppant is coated with resin to enhance strength, chemical resistance, and proppant flowback control, and to prevent or reduce crushed generated fines from migrating. However, resin coating may suffer drawbacks. While resin coating may increase the crush strength of the proppant by distributing the stress over a larger area, the core-material crush strength may remain unchanged for resin coatings without strengthening or reinforcing agents. Further, resin coating generally degrades over time in wellbore conditions. Also, resin may become plasticized when the resin absorbs water or oil in typical wellbore conditions. Wellbore temperature can further contribute to the proppant becoming plasticized. The plasticized resin coating can creep into the pore space of proppant pack and thereby reduce conductivity. Such creep can be accelerated in presence of formation temperatures greater than typical. Furthermore, cross-linked resin coatings can become brittle under heat and disintegrate, which can generate plastic fines that plug the proppant pack. Lastly, some resin systems are affected by corrosive chemicals, such as acid or base. For example, phenolic resins may be degraded by fluids having a pH greater than 9 or 10.

Sand and ceramic proppant can be coated with preceramic polymers or polymer-derived-ceramics (PDCs) resin. Polymer-derived-ceramics (PDCs) define a class of ceramic materials that are synthesized by thermal treatment (usually pyrolysis) of ceramic precursors (so-called preceramic polymers) under an inert or reacting atmosphere. By utilizing preceramic polymers, ceramic compositions such as amorphous silicon carbide (SiC), silicon oxycarbide (SiOC), and silicon carbonitride (SiCN), can be obtained after heat treatment, for example, at 1000-1100° C. in an inert atmosphere (argon or nitrogen). As there is generally no sintering step, PDC parts can be formed in some implementations without pressure at lower temperatures relative to traditional ceramic powder shaping technologies. Preceramic polymers can be processed utilizing existing technologies suitable for polymers in general. Due to the PDC distinctive nanostructure of carbon-rich and free carbon domains, PDCs may show exceptional stability against oxidation, crystallization, phase separation, and creep even up to 1500° C. PDCs have been successfully employed for the fabrication of ceramic fibers, ceramic matrix composites (CMCs), and microstructures that may be part of the proppant coating.

Ceramic-coated proppant may increase the crush strength of the proppant material while avoiding shortcomings of resin-coated proppant. Inorganic proppant or particles and organic proppant or particles may be coated with ceramic compositions to give ceramic-coated proppant. The inorganic proppant that receives the ceramic coating may be ceramic, or proppant or particles that are non-ceramic (for example, sand or metal). The organic proppant that receives the ceramic coating may be, for example, walnut hulls or resin proppant. In the case of sand, the ceramic coating of sand may increase the crush strength of the proppant sand, thereby extending applications in hydraulic fracturing of proppant sand as compared to usage of the base proppant sand without coating. The proppant receiving the ceramic coating may be considered the core proppant (or core particles) and be inorganic particles (for example, sand particles, ceramic particles, or metal particles), organic particles, or non-ceramic particles (for example, sand or metal particles), as discussed. The techniques may prepare strengthened proppant by ceramic-coating the core proppant particles.

Figure 6:
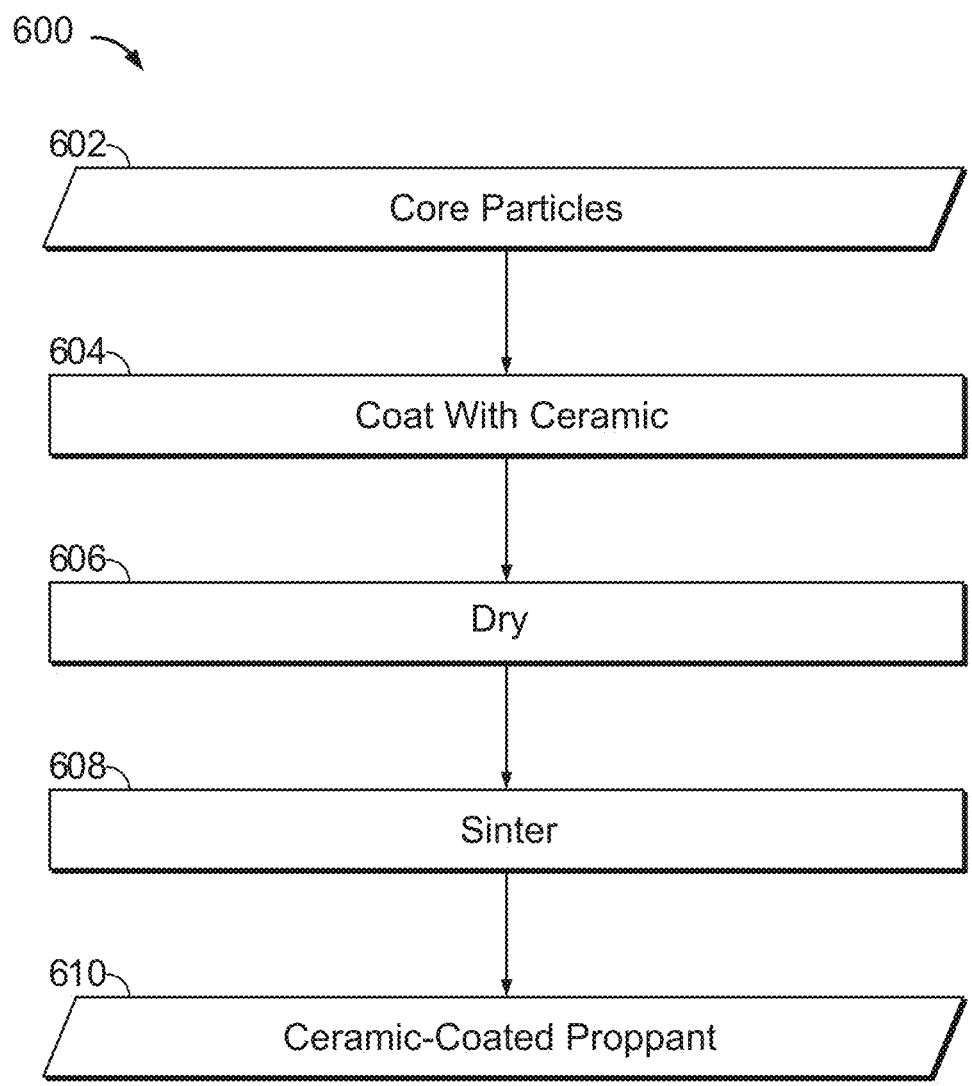
FIG. 6 is a block flow diagram of a method of forming a ceramic-coated proppant including receiving core particles, which may be ceramic proppant or non-ceramic proppant.

FIG. 6 is a method 600 of forming a ceramic-coated proppant 610. The ceramic-coated proppant 610 may be utilized in the present techniques of forming proppant pillars in hydraulic fracturing. The method 600 includes receiving core particles 602, which may be ceramic proppant or particles, or may be sand or other proppant or particles that are not ceramic. The particles 602 may be the underlying core proppant of the ceramic-coated proppant 610.

At block 604, the method includes coating the particles 602 with ceramic to give a ceramic coating on the particles 602. The ceramic coating may be formed on the particles 602 by applying ground ceramic to the particles 602. Coating the particles 602 with ceramic may involve coating the particles 602 with ground ceramic including calcined clay, uncalcined clay, bauxite, silica, or alumina, or any combinations thereof. The alumina content of the ground ceramic may be greater than 40 wt %. The ground ceramic may include a reinforcing agent(s) so that a CMC will form. Applying the ground ceramic may include coating the particles 602 with the ground ceramic via a drum coater, a mixing granulator, or spray coating, or any combinations thereof. The ceramic coating may be formed on the particles 602 by applying a slurry of the aforementioned ground ceramic to the particles 602. The coating of the particles 602 with ceramic may involve coating the particles 602 with a slurry having the ground ceramic and water. In implementations, the slurry has a solids content in a range of 10 wt % to 50 wt %. The coating of the proppant via the slurry may include coating the proppant with the slurry by drum coating, spray coating, fluidized-bed coating, or wet-dip coating, or any combinations thereof. The ceramic coating may be formed on the particles 602 by applying ceramic to the particles 602 by solution gelation. The ceramic coating may be formed on the particles 602 by applying alumina-silica sol-incorporated alpha-alumina to the particles 602. The ceramic coating may be formed on the particles 602 by applying a CMC having fibers to the particles 602. The ceramic coating may include organic fibers, inorganic fibers, organic particles, or inorganic particles, or any combinations thereof.

At block 606, the method includes drying the ceramic coating on the particles 602. The particles 602 having the ceramic coating may be dried at temperatures greater than ambient. In one implementation, the coated particles are dried at a temperature of at least 120° C. for at least 2 hours. The method may include densifying the ceramic coating by thermal treatment at a temperature, for example, in a range of 600° C. to 1400° C.

At block 608, the method includes sintering the ceramic coating on the particles 602 to give the ceramic-coated proppant 610. The particles 602 as coated may be sintered in a rotary kiln or via microwave sintering, or both. The ceramic coating may have a sintering aid such as FeO, Fe2O3, Fe3O4, MgO, ZnO, MnO, or Mn2O3, or any combinations thereof. The coated particles may be sintered at a temperature, for example, in the range of 600° C. to 1400° C., or at a temperature less than 1200° C.

A method of hydraulic fracturing including to form pillars of proppant including ceramic-coated proppant may include adding ceramic-coated proppant to fracturing fluid. The ceramic-coated proppant may be core proppant coated with a ceramic coating. The core proppant may be a non-ceramic particle (for example, sand, metal particle, or organic particle) or a ceramic particle. The ceramic in the ceramic coating may have an alumina content greater than 40 weight percent. The ceramic coating may include a binder, for example, at less than 1.5 weight percent of the ceramic coating. The ceramic coating may have a bonding additive to restrict delamination of the ceramic coating. The method of hydraulic fracturing may include injecting a fracturing fluid through a wellbore into a subterranean formation. The fracturing fluid may have the added ceramic-coated proppant. The injecting of the fracturing fluid may include pumping the fracturing fluid from the Earth surface into the wellbore. The fracturing fluid may flow through perforations (formed through wellbore casing) into the subterranean formation. The method includes hydraulically fracturing the subterranean formation with the fracture fluid to generate fractures in the geological formation. The fracturing fluid generating the fractures in the subterranean formation may include ceramic-coated proppant. The method includes positioning the ceramic-coated proppant in the fractures to support the fractures with the ceramic-coated proppant. The injected fracturing fluid having the ceramic-coated proppant may distribute the ceramic-coated proppant into the fractures. The method includes intermittently adjusting a characteristic of the fracturing fluid to affect the distribution to form pillars (accumulations) of the ceramic-coated proppant in the fractures. The pillars of proppant may maintain open the fractures. The ceramic-coated proppant may be sintered or densified ceramic-coated proppant to increase strength of the proppant for maintaining open the fractures. The ceramic coating of the proppant may include organic fibers, inorganic fibers, organic particles, inorganic particles, or a CMC, or any combinations thereof.

The particles (core proppant) that receives the ceramic-coating may include proppant materials to be strengthened by coating with ceramic. The ceramic-coated particles (ceramic-coated proppant) formed may have greater sphericity than the starting-material particles (core proppant). The ceramic-coated proppant may be sintered to provide enhanced strength. The ceramic-coated proppant may have greater compressive strength than the core proppant. Thus, the core proppant (for example, sand) as coated may be employed in environments having closure stresses in which typically the core proppant is not employed. In implementations, the compressive strength of the core proppant may be increased with the ceramic coating by a range of 10% to 300%. The crush resistance stress level (or crush strength) per International Standard ISO 13503-2 (First edition 2006-11-01) by the International Organization for Standardization can reach between 10,000 pounds per square inch (psi) to 40,000 psi. The particles or proppant as core proppant to be strengthen with ceramic coating may include ceramic proppant, wallnut hulls, cementitious particles, and sand (for example, brown sand, multicrystalline sand, or angular sand). The particle size of the core proppant may range from 100 mesh (150 microns) to 12/20 mesh (850 microns to 1700 microns). An example of brown sand is referred to as Brady sand mined from central Texas in the United States of America.

In some implementations, the proppant ceramic-coating coating of present techniques may be optionally coated or treated with agents to modify the wettability of the proppant. In certain embodiments, the ceramic-coated proppant is treated with fluorosilane ($SiH_3F$) to give the ceramic-coated proppant a hydrophobic character. In particular implementations, this treating with fluorosilane is performed while the ceramic-coated proppant is cooling after sintering. The fluorosilane may be sprayed onto the ceramic-coated proppant when temperature of the proppant is approximately in the range of 50° C. to 100° C., and the proppant tumbled to promote modifying of the surface of the ceramic-coated proppant. Other surface modifications may make the surface hydrophobic or omniphobic.

Figure 7:
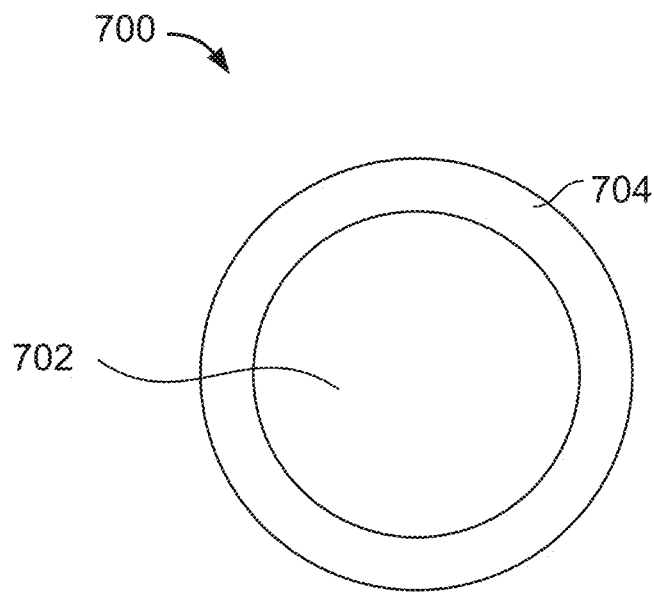
FIG. 7 is a diagram of a proppant having a core particle and a ceramic coating, and therefore may be characterized as a ceramic-coated particle or ceramic coated proppant.

FIG. 7 is a proppant 700 that may be utilized in the generation of pillars of proppant. The proppant 700 has a core particle 702 and a ceramic coating 704. Thus, the proppant 700 may be characterized as a ceramic-coated particle or ceramic-coated proppant. The core particle 702 may be inorganic (for example, sand, ceramic, or metal) or organic (for example, walnut hull). In some implementations, the core particle 702 itself is a proppant. Thus, the proppant 700 may be a ceramic-coated proppant with the underlying core particle 702 as a proppant. The core particle 702 can generally be any proppant or proppant-like material. The core particle 702 can be ceramic proppant. The core particle 702 can be non-ceramic proppant, such as sand, metal, or organic proppant. The ceramic coating 704 can be formed on the underlying proppant or particle by coating particles with ground ceramic, coating particles with ground ceramic slurry, coating particles with ceramic via solution-gelation, coating particles with ceramic via alumina-silica sol-incorporated alpha-alumina powder, and coating particles with ceramic coating having ceramic fibers embedded in CMC. The ceramic coating 704 can include CMC. CMCs include a reinforcing agent (for example, fibers) embedded in a ceramic matrix. The matrix and reinforcing agent can typically consist of any ceramic material, whereby carbon and carbon fibers can also be considered a ceramic material. The matrix and reinforcing agent can be the same ceramic material type. Examples the reinforcing agent include ceramic fibers that are carbon (C), silicon carbide (SiC), alumina ($Al_2O_3$), and mullite ($Al_2O_3-SiO_2$). In some implementations, the ceramic matrix materials can also be C, SiC, alumina, or mullite. Examples of CMCs (fiber/type of matrix) are $Al_2O_3/Al_2O_3$, C/C, C/SiC, and SiC/SiC. Further, the CMC may include a non-ceramic reinforcing agent(s) in addition to the ceramic reinforcing agent(s). In implementations, the reinforcing agent(s) is less than 5 wt % of ceramic coating 704, less than 2 wt % of the ceramic coating 704, or less than 1 wt % of the ceramic coating 704.

A surface modifier may be applied to the proppant 700. For example, the ceramic coating 704 may be coated or treated with surface modifier. A surface modifier may be agents (for example, $SiH_3F$) to modify the wettability of the proppant 700. The surface modifiers may be applied to the ceramic-coated proppant 700 (or to the ceramic-coated proppant 800 of FIG. 8) to give wetting properties, enhance different component compatibility, or improve the appearance of a coating surface. The surface modifier may be at least one of an alkyl fluorosilane solution, a fluorinated surfactant, a fluorinated polymer, and a fluorinated polymeric surfactant. The alkyl fluorosilane, which functions as a surface modifier, may include triethoxy(tridecafluorooctyl)silane. The surface modifier imparts gas wetting characteristics to the ceramic coating 704. Thus, application of the surface modifier may reduce interfacial tension and therefore reduce condensate or water blockage in the wellbore, which may increase gas relative permeability and reduce condensate banking. These wettability characteristics enhance the load recovery of hydraulic fracturing fluid or water after fracturing operation as the hydrocarbons may experience less friction from contact with the proppant. Consequently, the rate of hydrocarbon production and the overall amount of hydrocarbon production may be increased. The surface modifier may impart hydrophobic or oleophobic characteristics to the proppant, such that water will generally not wet the surface and thus the degradation of the proppants due to contact with water may be decreased. Moreover, hydrophobic interaction of hydrophobic proppant may contribute to agglomeration of the proppant in the pillars.

As similarly discussed with respect to resin coating, the nanoreinforcing agent enhances the mechanical strength of the ceramic coating 704 and provides resistance to chemicals utilized in hydraulic fracturing fluid. The nanoreinforcing agent may include ceramic materials, metallic materials, organic materials, inorganic materials, or mineral-based materials, as listed above. In one implementation, the coating 704 includes a reinforcing agent that is a coated carbon nanotube, such as zinc sulfide (ZnS) coated carbon nanotubes. ZnS coated carbon nanotubes provide additional thermal stability and mechanical strength. Weight loss as a function of temperature for ZnS-coated multi-walled carbon nanotubes (MWCNT) is less than for non-coated MWCNT. The ZnS coated multi-walled carbon nanotubes retain greater weight in thermo-gravimetric analysis (TGA) compared to multi-walled carbon nanotubes without a ZnS coating. In another implementation, the ceramic coating 704 includes silica (SiO2) coated single-walled carbon nanotubes (SWNT). SiO2 coated carbon nanotubes may better fuse with neighboring proppants in a pillar for agglomeration of proppant in the pillar, generate a stronger proppant pack, and mitigate proppant flowback.

For the CMC of the ceramic coating 704 as a nanocomposite, the reinforcing agents may include nanoreinforcing agents (or nanofillers). More than one type of nanoreinforcing agent may be employed in the CMC. Certain implementations provide for a synergistic effect between two nanoreinforcing agents in the CMC or between a nanoreinforcing agent and the ceramic matrix in the CMC. As discussed with respect to resin coating, the nanoreinforcing agent may include graphene and carbon nanotubes in certain implementations. The graphene may increase the strength of the ceramic coating on the proppant, increase the conductivity of the ceramic-coated proppants, or both. As indicated, graphene can be provided in multiple desirable forms or combination of forms, for example, sheets, platelets, fibers, chemically-modified graphene, doped graphene, graphene nanotubes, functionalized graphene, grossly warped nanographene, or combinations of these. In some embodiments, the graphene includes graphene oxide or graphite, or a combination thereof. The carbon nanotubes may be single-walled nanotubes, double-walled nanotubes, multi-walled carbon nanotubes, or narrow-walled nanotubes, or any combinations thereof. The carbon nanotubes include values for diameter and aspect ratio, as listed above. Reinforcing the ceramic matrix by mixing in two nanoreinforcing agents may increase the proppant crush resistance performance. As discussed similarly with respect to resin coating, the two nanoreinforcing agents may include: (1) the nanoreinforcing agent in the form of tubes, fibers, rope, fibrils, or combinations of these, dispersed in the ceramic coating and bonded to (2) the nanoreinforcing agent in the form of platelets, 2D surface, ribbons, or combinations of these. In some embodiments, the two nanoreinforcing agents applied to give synergistic results in combination may include carbon nanotubes (which have an aspect ratio of greater than 100) and graphene (which provides a 2D planar surface) to give mechanical bridging throughout the proppant coating.

In certain implementations, the ceramic-coated proppant may be further coated with thermoset resin such as phenolic, epoxy, furan, urethane, polyimide, polyester, polyurea and the like. See, for example, FIG. 8. These thermoset-resin coatings may increase the strength of ceramic-coated proppant. In some cases, this thermoset resin on the ceramic coating may increase the binding of ceramic-coated particles in a proppant pack or pillar for flowback proppant control. The applied resins as functionalize can be made hydrophobic, hydrophilic, non-wetting, omniphobic, or intermediate wet depending on the application. Again, the ceramic-coated particle can further be coated with a resin (for example, a thermoset resin).

Figure 8:
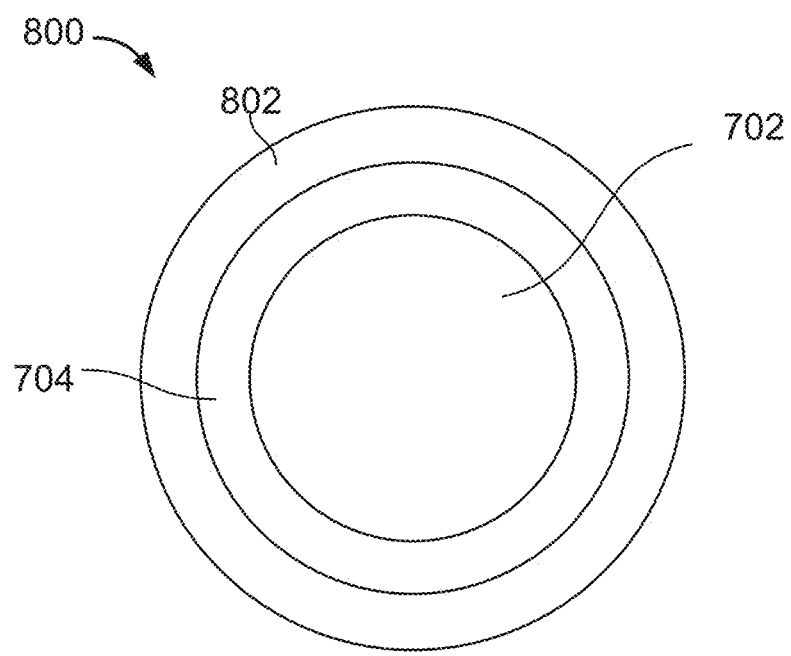
FIG. 8 is a diagram of the ceramic-coated proppant of FIG. 7 having and additional coating that is a polymer coating (an outer polymer layer), and therefore may be characterized as double coated.

FIG. 8 is a ceramic-coated proppant 800 that may be utilized as proppant in the formation of pillars of proppant in fractures in hydraulic fracturing. The ceramic-coated proppant 800 is the ceramic-coated proppant 700 (FIG. 7) having a polymer coating 802 (an outer polymer layer). Thus, the ceramic-coated proppant 800 may be characterized as double coated. The ceramic-coated proppant 800 includes the core particle 702 (for example, core proppant) having the ceramic coating 704 and the polymer coating 802. The ceramic-coated proppant 800 includes the polymer coating 802 at a weight percent in a range of 0.5% to 15%, 0.5% to 10%, 1.0% to 8%, 1.5% to 6%, 1.0% to 5%, or 0.5% to 4.5%, or at least 2% or at least 4%. In hydraulic fracturing of a geological formation with hydraulic fracturing fluid having the ceramic-coated proppant 800, the polymer coating 802 may facilitate pillar fracturing and flow back. When the polymer coating 802 (outer polymeric layer) is degraded, the ceramic coating 704 provides for longer service life of the proppant 800 than without the ceramic coating 704. The polymer applied as the polymer coating 802 may include resin (including thermoset resin), polyester, urea aldehyde, polyurethane, vinyl esters, or furfural alcohol, or any combinations of these. In implementations, the resin may be a mixture of organic compounds and is typically convertible into polymers. The viscosity of resin when applied may be, for example, greater than 20 cP measured at a temperature of 120° C. The resin may include phenolic resin, epoxy resin, furan resin, polyurethane resin, polyurea resin, polyester, polyamide-imide resin, polyamide resin polyurea/polyurethane resin, urea-formaldehyde resin, melamine resin, silicone resin, vinyl ester resin, or combinations of these. The resin may be novolacs or resoles.

An embodiment is a method of hydraulic fracturing, including injecting a fracturing fluid through a wellbore into a geological formation. The fracturing fluid includes a ceramic-coated proppant that is a core proppant coated with a ceramic coating, wherein the core proppant does not include ceramic. The core proppant may include walnut hulls, cementitious particles, or sand, or any combinations thereof. The ceramic-coated proppant may be further coated with a resin. The method includes hydraulically fracturing the geological formation with the fracturing fluid to generate fractures in the geological formation, and conveying the ceramic-coated proppant via the fracturing fluid into the fractures. The method includes intermittently adjusting a characteristic (e.g., rheology, rheological property, viscosity, viscoelasticity, proppant suspension, proppant settling velocity, surfactant concentration, salt concentration, FQ, etc.) of the fracturing fluid conveying the proppant to form pillars of the ceramic-coated proppant in the fractures.

Another embodiment is a system for hydraulic fracturing. The system includes a source of fracturing fluid. The system includes a pump operationally coupled to the source to provide the fracturing fluid through a wellbore into a subterranean formation to hydraulically fracture the subterranean formation to generate fractures in the subterranean formation, wherein the fracturing fluid to convey proppant into the fractures. The system includes a control system to intermittently adjust a characteristic of the fracturing fluid conveying the proppant to form pillars of proppant in the fractures. The intermittent adjustments may be at a frequency having an interval in a range of 2 minutes to 100 minutes. The characteristic comprises viscosity or proppant suspension, or both. The characteristic may be concentration of a surfactant in the fracturing fluid. The characteristic may be concentration of microparticles or concentration of nanoparticles, or both, in the fracturing fluid. The fracturing fluid may be foam fracturing fluid, wherein the characteristic is concentration of a foaming surfactant in the foam fracturing fluid. The characteristic may be FQ of the foam fracturing fluid, and wherein to intermittently adjust the FQ includes to adjust an amount of gas (e.g., nitrogen) or supercritical CO2, or both, in the fracturing fluid to form the pillars of proppant in the fractures. The fracturing fluid may be VES-based fracturing fluid, wherein the characteristic is concentration of VES in the VES-based fracturing fluid. The characteristic may be concentration of salt in the VES-based fracturing fluid or in the brine added to the VES-based fracturing fluid. The characteristic may be a type of salt in the brine or in the VES-based fracturing fluid. The fracturing fluid may be oil-based fracturing fluid, and wherein the characteristic is concentration of crosslinker metal ions in the oil-based fracturing fluid. The fracturing fluid may be emulsion fracturing fluid, wherein the characteristic is at least one of concentration of an emulsifying surfactant in the emulsion fracturing fluid or ratio of water to oil in the emulsion fracturing fluid. The proppant may be proppant having advanced coatings. In particular, as discussed, the proppant may be resin-coated proppant or ceramic-coated proppant (e.g., having CMC). The proppant may be double-coated proppant in having a ceramic coating and an outer polymer layer as a resin coating on the ceramic coating.

Yet another embodiment is a method of hydraulic fracturing, including: (1) providing a fracturing fluid through a wellbore into a subterranean formation; (2) hydraulically fracturing the subterranean formation with the fracturing fluid, thereby generating fractures in the subterranean formation; (3) conveying proppant in the fracturing fluid through the wellbore into the fractures; and (4) intermittently adjusting a characteristic of the fracturing fluid conveying the proppant to form pillars of proppant in the fractures. To form the pillars may involve to agglomerate the proppant. The characteristic intermittently adjusted may be rheology or a rheological property. The characteristic may be viscosity or proppant suspension, or both. In implementations, intermittently adjusting the characteristic does not involve changing type of fracturing fluid or pulsing different types of fracturing fluid. In some implementations, intermittently adjusting the characteristic includes adjusting the characteristic at a frequency including an interval in a range of 2 minutes to 2 hours, or in a range of 2 minutes to 100 minutes. The characteristic may be concentration of surfactant in the fracturing fluid, concentration of salt in brine added to the fracturing fluid, or concentration of salt in the fracturing fluid, or any combinations thereof. The characteristic may be concentration of microparticles or concentration of nanoparticles, or both, in the fracturing fluid. In certain implementations, the fracturing fluid has foam (and thus the fracturing fluid may be foam fracturing fluid), wherein the characteristic intermittently adjusted is associated with the foam, may be at least one of foam stability or concentration of foaming surfactant in the fracturing fluid, and/or may be FQ (e.g., in the range of 52% to 80% by volume). Intermittently adjusting the concentration of the foaming surfactant (if such adjustments implemented) may involve repeatedly cycling through a first concentration of the foaming surfactant in the foam fracturing fluid and a second concentration of the foaming surfactant in the foam fracturing fluid different than the first concentration. Likewise, intermittently adjusting the concentration of the foaming surfactant may involve repeatedly cycling through a first concentration of the foaming surfactant in the foam fracturing fluid, a second concentration of the foaming surfactant in the foam fracturing fluid different than the first concentration, and a third concentration of the foaming surfactant in the foam fracturing fluid different than the first concentration and the second concentration. The fracturing fluid may be VES-based fracturing fluid. The characteristic intermittently adjusted may be concentration of VES in the VES-based fracturing fluid. Intermittently adjusting the concentration of the VES in the VES-based fracturing fluid includes repeatedly cycling through a first concentration of the VES in the VES-based fracturing fluid and a second concentration of the VES in the VES-based fracturing fluid different than the first concentration. Similarly, intermittently adjusting the concentration of the VES in the VES-based fracturing fluid includes repeatedly cycling through a first concentration of the VES in the VES-based fracturing fluid, a second concentration of the VES in the VES-based fracturing fluid different than the first concentration, and a third concentration of the VES in the VES-based fracturing fluid different than the first concentration and the second concentration. The characteristic intermittently adjusted may be concentration or type of salt in brine incorporated into VES-based fracturing fluid or concentration or type of salt in the VES-based fracturing fluid, or any combinations thereof. Intermittently adjusting the type of the salt (if such adjustments implemented) may involve repeatedly cycling through a first salt type that is divalent salt and a second salt type that is monovalent salt. The characteristic intermittently adjusted may be concentration of microparticles or concentration of nanoparticles, or both, in the VES-based fracturing fluid. The fracturing fluid may be oil-based fracturing fluid, wherein the characteristic intermittently adjusted may be concentration of crosslinker metal ions in the oil-based fracturing fluid. The fracturing fluid may be emulsion fracturing fluid, and wherein the characteristic intermittently adjusted may include concentration of an emulsifying surfactant in the emulsion fracturing fluid or a ratio of water to oil in the emulsion fracturing fluid, or a combination thereof. The fracturing fluid may be emulsion fracturing fluid, wherein the characteristic intermittently adjusted may be concentration of salt in brine incorporated into the emulsion fracturing fluid or concentration of salt in the emulsion fracturing fluid, or a combination thereof. The fracturing fluid may be emulsion fracturing fluid, wherein the characteristic intermittently adjusted may be a concentration of microparticles or nanoparticles, or both, in the emulsion fracturing fluid.

Intermittently adjusting the characteristic to form the pillars in the fractures may utilize less proppant than conveying the proppant to the fractures without adjusting the characteristic and with depositing the proppant in the fractures without forming the pillars in the fractures. In other words, implementations of the present techniques that form proppant pillars via intermittently adjusting a characteristic of the fracturing fluid may utilize less proppant in a range of 1% less to 50% less as compared to conventional hydraulic fracturing/proppant placement. The proppant may include proppant coated with resin or tackifier. If so, the resin or tackifier may fuse between neighboring proppant in the pillars at downhole conditions (e.g., temperature and pressure in the wellbore and subterranean formation) to advance or promote stability of the pillars. The fusing of the resin (or tackifier) among the proppants may give stable proppant pillars. The proppant may have hydrophobic coating, wherein to form the pillars may involve agglomeration of the proppant by hydrophobic interaction via the hydrophobic coating. The agglomeration may give pillar stability. In implementations, the agglomeration of the proppant (e.g., binding together of the proppant) increases stability of the pillars. The proppant may be ceramic-coated proppant, ceramic-coated sand, resin-coated proppant, resin-coated sand, or any combinations thereof. These differing proppant may have different respective density. Other proppant types are applicable, also potentially at different densities. The proppant may be the various proppant types and coatings described herein. In implementations, the characteristic of the fracturing fluid intermittently adjusted to form the pillars in the fractures may be density of the proppant conveyed in the fracturing fluid. Proppant at different density may have a different settling rate. The density of the proppant conveyed in the fracturing fluid can be altered by adding proppant having a first density to the fracturing fluid for a first time period of the sequence and adding proppant having a second density different than the first density to the fracturing fluid for a second time period of the sequence. In implementations, the characteristic of the fracturing fluid intermittently adjusted may be size of the proppant conveyed in the fracturing fluid. If so, pillars may be formed at different depths in a vertical fracture where the fractures include vertical fractures. Lastly, the fracturing fluid may have sacrificial suspending agents. The suspending agents may be degradable material. The suspending agents may be in the form of fiber or particles, or both.

A number of implementations have been described. Nevertheless, it will be understood that various modifications may be made without departing from the spirit and scope of the disclosure.

What is claimed is:

1. A method of hydraulic fracturing, comprising:
providing a fracturing fluid through a wellbore into a subterranean formation;
hydraulically fracturing the subterranean formation with the fracturing fluid, thereby generating fractures in the subterranean formation;
conveying proppant in the fracturing fluid through the wellbore into the fractures, wherein the proppant comprises resin coating including unfunctionalized organic resin and functionalized nanoparticles that adhere to the unfunctionalized organic resin, wherein nanoparticles are reacted with at least one of an alkoxysilane solution or a halosilane solution to form the functionalized nanoparticles comprising at least one of a fluorosilane moiety, a perfluorosilane moiety, or an alkylsilane moiety for incorporation into the resin coating, and wherein a surface modifier is applied to the resin coating prior to inclusion of the proppant in the fracturing fluid, the surface modifier comprising at least one of an alkyl fluorosilane, a fluorinated surfactant, a fluorinated polymer, or a fluorinated polymeric surfactant; and
intermittently adjusting a characteristic of the fracturing fluid conveying the proppant to form pillars of proppant in the fractures, wherein the fracturing fluid comprises foam, wherein the characteristic comprises foam quality (FQ) of the foam, and wherein to intermittently adjust the FQ comprises to repeatedly cycle through values of the FQ.

2. The method of claim 1, wherein to repeatedly cycle through values of the FQ comprises to adjust a concentration of gas in the fracturing fluid, wherein the gas comprises nitrogen or carbon dioxide, or both, wherein to form the pillars comprises to agglomerate the proppant, and wherein the proppant comprises sand having the resin coating.

3. The method of claim 1, wherein to intermittently adjust the FQ comprises to adjust, in the fracturing fluid, at least one of an amount of gas, an amount of supercritical fluid, an amount of water, or an amount of brine, wherein the functionalized nanoparticles comprise nanotubes, nanofibers, or nanoplatelets, or any combinations thereof, and wherein the unfunctionalized organic resin comprises phenolic resin, epoxy resin, furan resin, polyurethane resin, polyurea resin, polyester, polyamide-imide resin, polyamide resin, polyurea/polyurethane resin, urea-formaldehyde resin, melamine resin, silicone resin, vinyl ester resin, phenol-formaldehyde resin, novolac, or resole, or any combinations thereof.

4. The method of claim 1, wherein providing the fracturing fluid comprises pumping the fracturing fluid through the wellbore into the subterranean formation, and wherein to repeatedly cycle through values of the FQ comprises to adjust an addition rate of gas injected into the fracturing fluid as the fracturing fluid is being pumped or to adjust an amount of liquid in the fracturing fluid being pumped, or a combination thereof, and wherein the functionalized nanoparticles comprise first nanoparticles comprising graphene and second nanoparticles comprising carbon nanotubes.

5. The method of claim 1, wherein the fracturing fluid comprises sacrificial suspending agents comprising degradable material in form of fiber or particles, or both, and wherein the surface modifier comprises the alkyl fluorosilane alkyl comprising triethoxy(tridecafluorooctyl)silane.

6. A method of hydraulic fracturing, comprising:
providing a fracturing fluid through a wellbore into a subterranean formation;
hydraulically fracturing the subterranean formation with the fracturing fluid, thereby generating fractures in the subterranean formation;
conveying proppant in the fracturing fluid through the wellbore into the fractures, wherein the proppant comprises resin coating including unfunctionalized organic resin and functionalized nanoparticles that adhere to the unfunctionalized organic resin, wherein the functionalized nanoparticles comprise at least one of a fluorosilane moiety, a perfluorosilane moiety, or an alkylsilane moiety, wherein the functionalized nanoparticles are formed by reacting nanoparticles with at least one of an alkoxysilane solution or a halosilane solution, and wherein a surface modifier is applied to the resin coating prior to inclusion of the proppant in the fracturing fluid, the surface modifier comprising at least one of an alkyl fluorosilane, a fluorinated surfactant, a fluorinated polymer, or a fluorinated polymeric surfactant; and intermittently adjusting a characteristic of the fracturing fluid conveying the proppant to form pillars of proppant in the fractures, wherein the fracturing fluid is foam fracturing fluid, wherein the characteristic comprises FQ of the foam fracturing fluid, wherein intermittently adjusting the FQ comprises cycling through a first value of the FQ and a second value of the FQ, wherein the second value is different than the first value for the pillars to form.

7. The method of claim 6, wherein the functionalized nanoparticles consists of first nanoparticles that are graphene and second nanoparticles that are carbon nanotubes, wherein providing the fracturing fluid comprises pumping the fracturing fluid from Earth surface through the wellbore into the subterranean formation in Earth crust, wherein cycling through the first value and the second value comprises adjusting at the Earth surface an addition rate of gas injected into the fracturing fluid as the fracturing fluid is being pumped or adjusting at the Earth surface an amount of liquid in the fracturing fluid being pumped, or a combination thereof, and wherein the FQ is in a range of 52% to 80% by volume.

8. The method of claim 6, wherein the FQ is adjusted by adding gas or liquid to the foam fracturing fluid, wherein intermittently adjusting the FQ comprises cycling through an additional value of the FQ of the foam fracturing fluid that is different than the first value and the second value, wherein the unfunctionalized organic resin fuses between neighboring proppant in the pillars at downhole conditions to advance stability of the pillars, and wherein the resin coating comprises a resin nanocomposite coating comprising the nanoparticles as a nanoreinforcing agent uniformly distributed throughout the resin nanocomposite coating.

9. The method of claim 6, wherein intermittently adjusting the characteristic to form the pillars in the fractures comprises utilizing less proppant than conveying the proppant to the fractures without adjusting the characteristic and with depositing the proppant in the fractures without forming the pillars in the fractures, and wherein the surface modifier comprises the alkyl fluorosilane alkyl comprising triethoxy(tridecafluorooctyl)silane.

10. The method of claim 6, wherein to intermittently adjust the FQ comprises to intermittently adjust a concentration of gas or a concentration of supercritical fluid, or both, in the foam fracturing fluid, wherein the unfunctionalized organic resin comprises phenolic resin, epoxy resin, furan resin, polyurethane resin, polyurea resin, polyester, polyamide-imide resin, polyamide resin, polyurea/polyurethane resin, urea-formaldehyde resin, melamine resin, silicone resin, vinyl ester resin, phenol-formaldehyde resin, novolac, or resole, or any combinations thereof, and wherein the surface modifier comprises the alkyl fluorosilane alkyl.

11. A method of hydraulic fracturing, comprising:
providing a foam fracturing fluid through a wellbore into a subterranean formation;

hydraulically fracturing the subterranean formation with the foam fracturing fluid, thereby generating fractures in the subterranean formation;

conveying proppant in the foam fracturing fluid through the wellbore into the fractures, wherein the proppant comprises resin coating including unfunctionalized organic resin and functionalized nanoparticles that adhere to the unfunctionalized organic resin, wherein nanoparticles are reacted with at least one of an alkoxysilane solution or a halosilane solution to form the functionalized nanoparticles comprising at least one of a fluorosilane moiety, a perfluorosilane moiety, or an alkylsilane moiety, and wherein a surface modifier is applied to the resin coating prior to inclusion of the proppant in the fracturing fluid, the surface modifier comprising at least one of an alkyl fluorosilane, a fluorinated surfactant, a fluorinated polymer, or a fluorinated polymeric surfactant; and forming pillars of proppant in the fractures by intermittently adjusting foam quality (FQ) of the foam fracturing fluid conveying the proppant, wherein to intermittently adjust the FQ comprises to adjust, in the foam fracturing fluid, at least one of an amount of gas, an amount of supercritical fluid, or a liquid, and wherein intermittently adjusting the FQ comprises cycling through a first value of the FQ and a second value of the FQ different than the first value.

12. The method of claim 11, wherein the functionalized nanoparticles comprise first nanoparticles comprising graphene and second nanoparticles comprising carbon nanotubes, and wherein the FQ is in a range of 52% to 80% by volume.

13. The method of claim 11, wherein intermittently adjusting the FQ comprises cycling through an additional value of the FQ of the foaming fracturing fluid that is different than the first value and the second value, and wherein the surface modifier comprises the alkyl fluorosilane alkyl.

* * * * *